(12) United States Patent
Du et al.

(10) Patent No.: US 12,056,060 B2
(45) Date of Patent: Aug. 6, 2024

(54) END-TO-END EFFICIENT ENCRYPTION WITH SECURITY CHAINING

(71) Applicant: Dell Products, L.P., Round Rock, TX (US)

(72) Inventors: Lejin Du, Kanata (CA); Oleksandr Babiychuk, Ottawa (CA); Alykhan Nathoo, Ottawa (CA); John T. Fitzgerald, Falmouth, MA (US); Michael E. Specht, Conway, NH (US); Seema G. Pai, Shrewsbury, MA (US); Joann J. Kent, Auburn, MA (US)

(73) Assignee: Dell Products, L.P., Round Rock, TX (US)

( * ) Notice: Subject to any disclaimer, the term of this patent is extended or adjusted under 35 U.S.C. 154(b) by 100 days.

(21) Appl. No.: 17/816,112

(22) Filed: Jul. 29, 2022

(65) Prior Publication Data
US 2024/0037043 A1     Feb. 1, 2024

(51) Int. Cl.
*G06F 12/14* (2006.01)
*H04L 9/08* (2006.01)

(52) U.S. Cl.
CPC ........ *G06F 12/1408* (2013.01); *H04L 9/0822* (2013.01); *G06F 2212/1052* (2013.01)

(58) Field of Classification Search
CPC ......... G06F 12/1408; G06F 2212/1052; H04L 9/0822
USPC ....................................................... 713/193
See application file for complete search history.

(56) References Cited

U.S. PATENT DOCUMENTS

| | | | | |
|---|---|---|---|---|
| 4,645,871 A | * | 2/1987 | Bremer ................. | H04L 9/0625 380/2 |
| 5,657,390 A | * | 8/1997 | Elgamal .................... | H04L 9/40 713/151 |
| 6,502,102 B1 | * | 12/2002 | Haswell ............... | G06F 11/3664 707/999.102 |
| 6,643,701 B1 | * | 11/2003 | Aziz ....................... | H04L 67/14 709/227 |

(Continued)

OTHER PUBLICATIONS

Katriel Cohn-Gordon; On Ends-to-Ends Encryption; ACM; year:2018; pp. 1802-1819.*

*Primary Examiner* — Monjur Rahim
(74) *Attorney, Agent, or Firm* — Fogarty LLP

(57) ABSTRACT

In end-to-end efficient encryption with security chaining a data source Information Handling System (IHS) encrypts a data volume, generates and updates metadata in a trailer of the data volume, and generates and updates out-of-band handshake signals indicating an encryption key use slot in the metadata. Data connection segments each include a left-bound interface of one IHS and a right-bound interface of another. Each interface performs synchronous data volume write-encrypt and read-decrypt functions on the data volume in an IHS, perform in-band encryption metadata processing, process out-of-band control signals, and execute an encryption configuration state machine, which uses the metadata and control signals as input to direct write-encrypt and read-decrypt functions on the data volume in the segment. Security chaining logic in each IHS relays between the left and right-bound interfaces, synchronizes and regenerates the control signals for each segment, and coordinates the state machines for the up-stream and down-stream segments.

20 Claims, 23 Drawing Sheets

(56) References Cited

U.S. PATENT DOCUMENTS

| | | | |
|---|---|---|---|
| 6,701,514 B1* | 3/2004 | Haswell | G06F 11/3664 |
| | | | 717/124 |
| 6,704,873 B1* | 3/2004 | Underwood | H04L 67/10 |
| | | | 709/249 |
| 6,718,535 B1* | 4/2004 | Underwood | G06F 9/451 |
| | | | 717/101 |
| 6,859,527 B1* | 2/2005 | Banks | H04L 67/02 |
| | | | 370/352 |
| 6,898,285 B1* | 5/2005 | Hutchings | H04N 21/26606 |
| | | | 726/4 |
| 6,907,546 B1* | 6/2005 | Haswell | G06F 11/3684 |
| | | | 717/124 |
| 7,100,195 B1* | 8/2006 | Underwood | H04L 63/0823 |
| | | | 707/999.009 |
| 7,382,882 B1* | 6/2008 | Immonen | H04L 63/061 |
| | | | 380/247 |
| 7,430,757 B1* | 9/2008 | Chari | H04L 67/56 |
| | | | 713/160 |

* cited by examiner

END-TO-END EFFICIENT ENCRYPTION WITH SECURITY CHAINING

CROSS-REFERENCE TO RELATED APPLICATIONS

This disclosure is related to U.S. patent application Ser. No. 17/816,199, entitled Enablement and Disablement of End-to-End Efficient, filed concurrent herewith, on Jul. 29, 2022, and to U.S. patent application Ser. No. 17/816,217, entitled Rekeying End-to-End Efficient Encryption with Security Chaining, also filed concurrent herewith, on Jul. 29, 2022, both of which are incorporated herein by reference.

FIELD

This disclosure relates generally to IHSs (IHSs), and, more specifically, to systems and methods of for end-to-end efficient encryption with security chaining.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Data, from source to destination, have many segments in a network path. Typical end-to-end encryption deals with one segment of the network path and are lacking in security coordination of multiple segments of the complete network path. Typical end-to-end encryption also lacks operational capability for online and/or instant rekey (e.g., refreshing the encryption key of an existing encrypted system, such as peer-to-peer encrypted communication, or data on a storage medium that is encrypted) and existing data sets encryption and other end-to-end security control flexibilities.

SUMMARY

Embodiments of end-to-end efficient encryption with security chaining are described. In an illustrative, non-limiting example a data source Information Handling System (IHS) encrypts a data volume, generates and updates metadata in a trailer of the encrypted data volume, and generates and updates out-of-band handshake signals indicating an encryption key use slot in the metadata. The data volume may be a Small Computer System Interface Logic Unit Number (SCSI LUN) data volume or a Non-Volatile Memory Express (NVMe) data volume.

The metadata may include volume metadata, encryption metadata and metadata protection. The volume metadata may include an encryption identifier, a volume Universally Unique Identifier (UUID), an encryption type and/or capability, and/or an encryption mode. The encryption metadata may include state machine input, and/or encryption parameters. The encryption parameters may include key encryption properties, including the UUID, algorithm, and/or control information. The metadata protection may include integrity control with an authenticated checksum, version control, and/or segment configuration state control with designated data volume content verification. The integrity control with authenticated checksum may be a hash-based message authentication code, and the version control may be a modification time and/or sequence number.

The handshake signals may include encryption control signals carried on networking protocols comprising, such as SCSI commands, internet SCSI (iSCSI) commands, NVMe commands, or Transmission Control Protocol/Internet Protocol (TCP/IP) connection commands.

A plurality of data connection segments each include a left-bound interface of one IHS and a right-bound interface of another IHS. The data source IHS, in various implementations, includes one left-bound interface that encrypts the data volume, generates and updates the metadata in the trailer of the encrypted data volume, and generates and updates the out-of-band handshake signals. Some implementations include at least one other plurality of data connection segments, therein, the data source IHS includes a left-bound interface for each. The data source information handling system left-bound interface may request a Key Encryption Key (KEK) from a key management system and each interface may retrieve the KEK from the key management system, unwrap a Data Encryption Key (DEK) in accordance with the metadata and control signals for use in write-encrypt and read-decrypt functions on the encrypted data volume in the segment. To wit, each of the interfaces perform synchronous data volume write-encrypt and read-decrypt functions on the encrypted data volume in an IHS, perform in-band encryption metadata processing, process out-of-band encryption handshake control signals, and execute an encryption configuration state machine. This encryption configuration state machine uses the metadata and control signals as input to direct write-encrypt and read-decrypt functions on the encrypted data volume in the segment.

A security chaining logic component hosted on each IHS relays between the left-bound interface and the right-bound interface, synchronizes and regenerates encryption handshake control signals for each segment, and coordinates the state machine for the up-stream segment and the state machine for the down-stream segment.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may, in accordance with embodiments of the present systems and methods, be a server (e.g., compute sled, storage sled, blade server, rack server, etc.), a network storage device, a personal computer (e.g., desktop or laptop), tablet computer, mobile device (e.g., personal digital assistant (PDA) or smart phone), or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
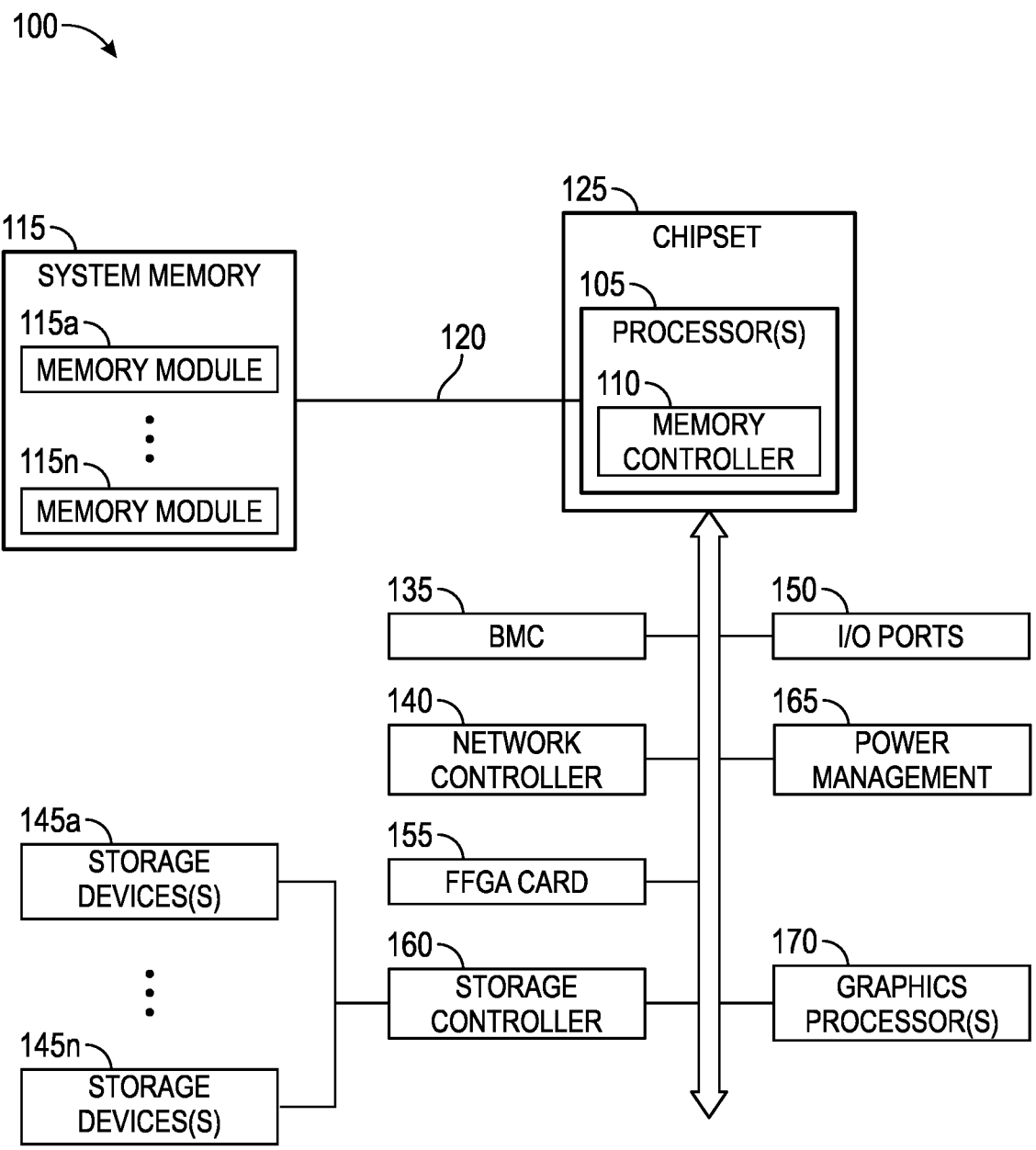
FIG. 1 is a block diagram illustrating components of an example of an Information Handling System (IHS), according to some embodiments.

A more detailed example of an IHS is described with respect to FIG. 1, in that FIG. 1 is a block diagram illustrating components of example IHS 100, according to some embodiments. IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

As illustrated, processor(s) 105 includes an integrated memory controller 110 that may be implemented directly within the circuitry of the processor 105, or the memory controller 110 may be a separate integrated circuit that is located on the same die as the processor 105. The memory controller 110 may be configured to manage the transfer of data to and from the system memory 115 of the IHS via a high-speed memory interface 120. The system memory 115 is coupled to processor(s) 105 via a memory bus 120 that provides the processor(s) 105 with high-speed memory used in the execution of computer program instructions by the processor(s) 105. Accordingly, system memory 115 may include memory components, such as static RAM (SRAM), dynamic RAM (DRAM), NAND Flash memory, suitable for supporting high-speed memory operations by the processor(s) 105. In certain embodiments, system memory 115 may combine both persistent, non-volatile memory and volatile memory.

In certain embodiments, the system memory 115 may be comprised of multiple removable memory modules. The system memory 115 of the illustrated embodiment includes removable memory modules 115a-n. Each of the removable memory modules 115a-n may correspond to a printed circuit board memory socket that receives a removable memory module 115a-n, such as a Dual In-line Memory Module (DIMM), that can be coupled to the socket and then decoupled from the socket as needed, such as to upgrade memory capabilities or to replace faulty memory modules. Other embodiments of IHS memory 115 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory, or soldered-in memory modules affixed to an IHS motherboard, etc.

IHS 100 may utilize chipset 125 that may be implemented by integrated circuits that are coupled to processor(s) 105. In this embodiment, processor(s) 105 is depicted as a component of chipset 125. In other embodiments, all of chipset 125, or portions of chipset 125 may be implemented directly within the integrated circuitry of processor(s) 105. The chipset may provide the processor(s) 105 with access to a variety of resources accessible via one or more buses 130. Various embodiments may utilize any number of buses to provide the illustrated pathways served by bus 130. In certain embodiments, bus 130 may include a PCIe switch fabric that is accessed via a PCIe root complex.

As illustrated, IHS 100 includes BMC 135 to provide capabilities for remote monitoring and management of various aspects of IHS 100. In support of these operations, BMC 135 may utilize both in-band, sideband and/or out-of-band communications with certain managed components of IHS 100, such as, for example, processor(s) 105, system memory 115, chipset 125, network controller 140, storage device(s) 145, etc. BMC 135 may be installed on the motherboard of IHS 100 or may be coupled to IHS 100 via an expansion slot provided by the motherboard. As a non-limiting example of a BMC, the integrated Dell Remote Access Controller (iDRAC) from Dell® is embedded within Dell Power-Edge™ servers and provides functionality that helps information technology (IT) administrators deploy, update, monitor, and maintain servers remotely. BMC 135 may include non-volatile memory having program instructions stored thereon that are usable by CPU(s) 105 to enable remote management of IHS 100. For example, BMC 135 may enable a user to discover, configure, and manage BMC 135, setup configuration options, resolve and administer hardware or software problems, etc. Additionally, or alternatively, BMC 135 may include one or more firmware volumes, each volume having one or more firmware files used by the BIOS' firmware interface to initialize and test components of IHS 100.

IHS 100 may also include the one or more I/O ports 150, such as USB ports, PCIe ports, TPM (Trusted Platform Module) connection ports, HDMI ports, audio ports, docking ports, network ports, Fibre Channel ports and other storage device ports. Such I/O ports 150 may be externally accessible or may be internal ports that are accessed by opening the enclosure of the IHS 100. Through couplings made to these I/O ports 150, users may couple the IHS 100 directly to other IHSs, storage resources, external networks and a vast variety of peripheral components.

As illustrated, IHS 100 may include one or more FPGA (Field-Programmable Gate Array) cards 155. Each of the FPGA card 155 supported by IHS 100 may include various processing and memory resources, in addition to an FPGA logic unit that may include circuits that can be reconfigured after deployment of IHS 100 through programming functions supported by the FPGA card 155. Through such reprogramming of such logic units, each individual FGPA card 155 may be optimized to perform specific processing tasks, such as specific signal processing, security, data mining, and artificial intelligence functions, and/or to support specific hardware coupled to IHS 100. In some embodiments, a single FPGA card 155 may include multiple FPGA logic units, each of which may be separately programmed to implement different computing operations, such as in computing different operations that are being offloaded from processor 105.

IHS 100 may include one or more storage controllers 160 that may be utilized to access storage devices 145a-n that are accessible via the chassis in which IHS 100 is installed.

Storage controller 160 may provide support for RAID (Redundant Array of Independent Disks) configurations of logical and physical storage devices 145a-n. In some embodiments, storage controller 160 may be an HBA (Host Bus Adapter) that provides more limited capabilities in accessing physical storage devices 145a-n. In some embodiments, storage devices 145a-n may be replaceable, hot-swappable storage devices that are installed within bays provided by the chassis in which IHS 100 is installed. In embodiments where storage devices 145a-n are hot-swappable devices that are received by bays of chassis, the storage devices 145a-n may be coupled to IHS 100 via couplings between the bays of the chassis and a midplane of IHS 100. In some embodiments, storage devices 145a-n may also be accessed by other IHSs that are also installed within the same chassis as IHS 100. Storage devices 145a-n may include SAS (Serial Attached SCSI) magnetic disk drives, SATA (Serial Advanced Technology Attachment) magnetic disk drives, solid-state drives (SSDs) and other types of storage devices in various combinations.

As noted, processor(s) 105 may also be coupled to a network controller 140 via bus 130, such as provided by a Network Interface Controller (NIC) that allows the IHS 100 to communicate via an external network, such as the Internet or a LAN. In some embodiments, network controller 140 may be a replaceable expansion card or adapter that is coupled to a motherboard connector of IHS 100. In some embodiments, network controller 140 may be an integrated component of IHS 100.

A variety of additional components may be coupled to processor(s) 105 via bus 130. For instance, processor(s) 105 may also be coupled to a power management unit 165 that may interface with a power supply of IHS 100. In certain embodiments, a graphics processor 170 may be comprised within one or more video or graphics cards, or an embedded controller, installed as components of the IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100 and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 160. In some embodiments, BIOS may be configured to identify hardware components that are detected as being currently installed in IHS 100. In such instances, the BIOS may support queries that provide the described unique identifiers that have been associated with each of these detected hardware components by their respective manufacturers. In providing an abstraction layer by which hardware of IHS 100 is accessed by an operating system, BIOS may identify the I/O ports 150 that are recognized and available for use.

In some embodiments, IHS 100 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 100. These calculated hash values may then be compared against reference hash values that were previously stored in a secure non-volatile memory of the IHS, such as during factory provisioning of IHS 100. In this manner, a TPM may establish a root of trust that includes core components of IHS 100 that are validated as operating using instructions that originate from a trusted source.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip (SoC).

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 100 of FIG. 1, which is generally depicted as a server IHS, is only one example of a system in which the certain embodiments of the present systems and methods may be utilized. Indeed, the embodiments described herein may be used in various IHSs, such as a personal computer (e.g., desktop or laptop), tablet computer, mobile device (e.g., personal digital assistant (PDA) or smart phone), or other electronic devices, such as network router devices, televisions, custom telecommunications equipment for special purpose use, etc. That is, certain techniques described herein are in no way limited to use with the IHS of FIG. 1.

As noted, data, from source to destination, travels through many segments in a data and/or network path. Embodiments of the present systems and methods for end-to-end efficient encryption with security chaining protect data in every data path segment and provides cleartext accessibility for data processing efficiency at data nodes. To wit, embodiments of the present systems and methods provide data end-to-end efficient encryption (E2EEE) and security chaining from a data source (application) system to many compute and/or storage systems in the data and/or network path chain. Embodiments of the present systems and methods are applicable to compute systems with external storages storage replication, edge computing infrastructure with data gathering and/or collection path to data clouds, and/or the like.

Figure 2A:
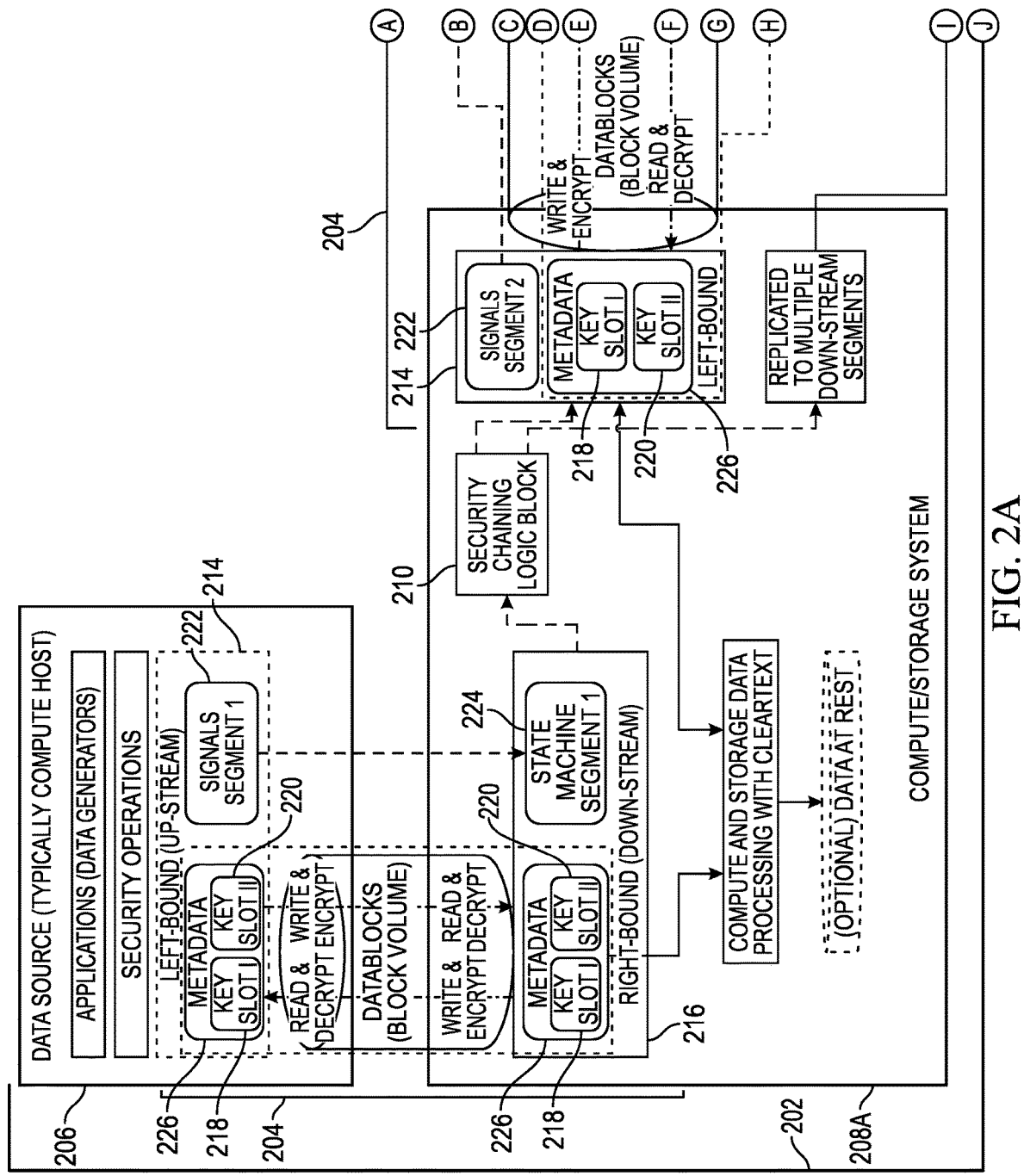
FIGS. 2A and 2B are partial views intended to form one complete view of a block diagram of an IHS network environment showing end-to-end efficient encryption with security chaining according to some embodiments.
Figure 2B:
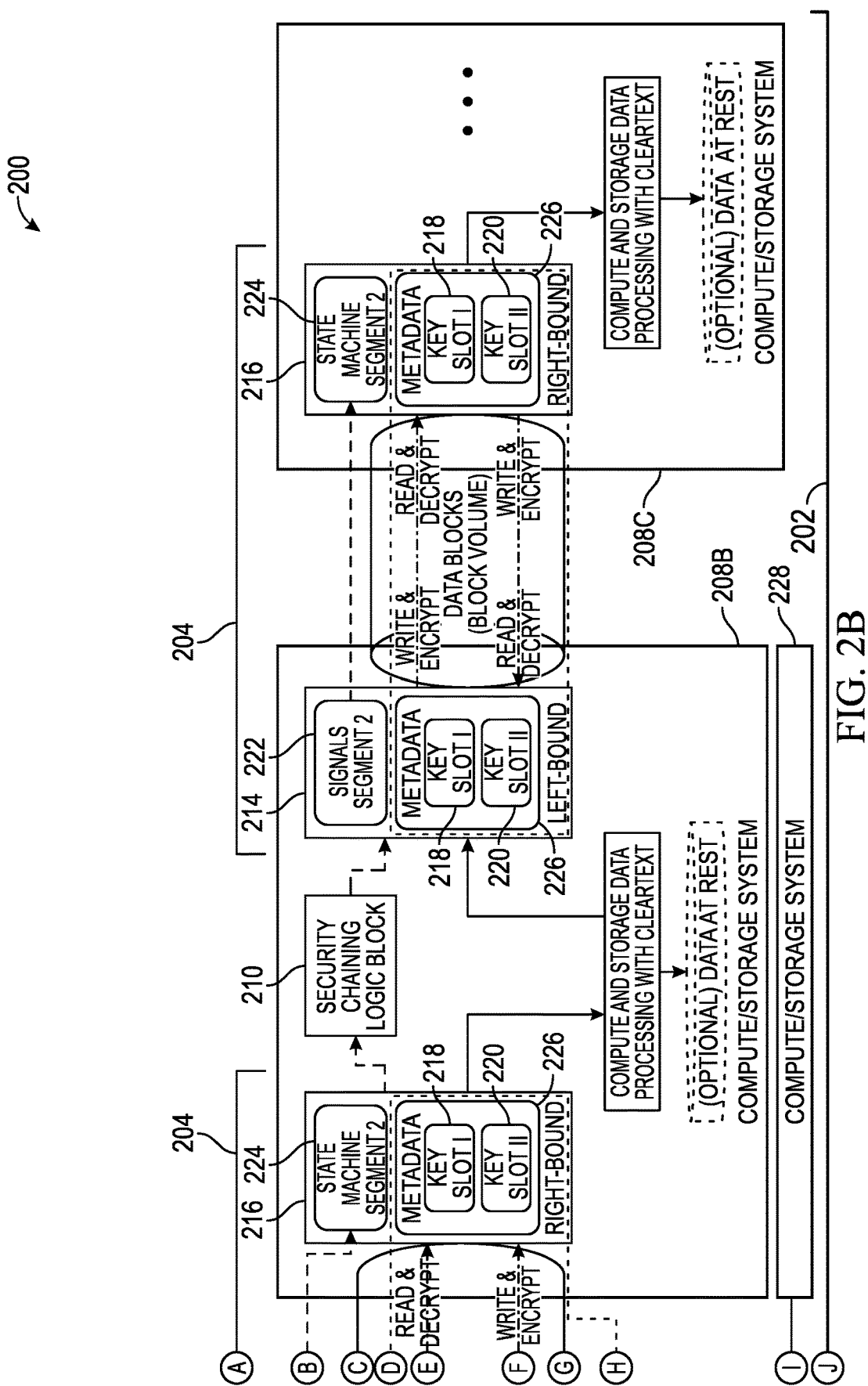

FIGS. 2A and 2B are partial views intended to form one complete view of a block diagram of IHS network environment 200 showing end-to-end efficient encryption with security chaining, for example (e.g., of a single (serial) segment chain 202), according to some embodiments. Implementation of embodiments of the present systems and methods result in segments 204 of E2EEE on the interfaces of each IHS 206, 208*a* through 208*n* which perform metadata processing, handshake signaling, and execution of encryption configuration state machines. Segments 204 of E2EEE on the interfaces of each IHS also perform data block encryption and decryption functions. Embodiments of the present systems and methods also include a security chaining component 210 on every IHS that relays the E2EEE segment between the left-bound and right-bound interfaces, in the respective IHS. On a data-source interface 214 (such as a compute host), embodiments of the present systems and methods may include a metadata and handshake signals generation component that creates and updates metadata and handshake signals and a security operation component that initiates and controls security operations, such as encryption enablement and disablement, rekeying, etc.

E2EEE in accordance with embodiments of the present systems and methods includes a number of data connection segments 204. In a relative manner, each segment includes left-bound (up-stream) interface 214 and right-bound (down-stream) interface 216. Thus, data-source IHS 206 (such as a compute host) may host such left-bound (up-stream) interface 206. Other IHSs in chain 202 provide both left bound and right bound interfaces. Both left bound and right bound interfaces write-encrypt and read-decrypt actions (i.e., functions) in a synchronous manner. The synchronization between left bound and right bound interfaces 214 and 216 is achieved by the combination of in-band (on device or data path) metadata key slot I and II 218 and 220, out-of-band (control channel) handshake signals 222 and state machine 224.

Security chaining logic block 210 performs adaptation from the up-stream segment to the down-stream segment. In-band metadata content 226 is immutable (cannot be changed), however, the location of metadata on device (e.g., metadata key slot I 218 or metadata key slot II 220) is mutable (flexible to change). Handshake signals 222 are regenerated for each segment. Signals 222 for up-stream segment and signals for down-stream segment are synchronized in each IHS. Each segment has a state machine (224). State machine 224 uses metadata 226 and signals 222 as input and guides (i.e., directs) write-encrypt and read-decrypt actions for the segment. The state machine for up-stream segment and state machine for down-stream segment are coordinated in each IHS. One up-stream segment can chain and/or bind multiple down-stream segments for data redundancy (i.e., replicate data, 228). Metadata 226 may be referred to herein as "immutable," meaning metadata 226 is not altered by any down-stream segment (interface) but is propagated. The data originator, data-source IHS 206, does modify the metadata, so for it, metadata is not "immutable."

Security operations include enabling and disabling of encryption of data, shallow (Key Encryption Key (KEK)) and deep (Data Encryption Key (DEK)) rekeying, etc., for all segments in the data path, as described in greater detail below. Embodiments of the present systems and methods have the following characteristics for all security operations. Any operation, from initiation to completion, involves only processing of control information. The control information includes metadata 226, handshake signals 222 for every E2EEE segment in the data path, and state machines 224 of both endpoints 214, 216 for every E2EEE segment 204. Since only control information processed for every operation, any operation can be completed instantly or in a very short time. Any operation is agnostic to data volume size.

Descriptions herein list some security operations using Small Computer System Interface Logic Unit Number (SCSI LUN) as the example of data volume(s) and SCSI commands as (the) out-of-band control channel(s).

Figure 3A:
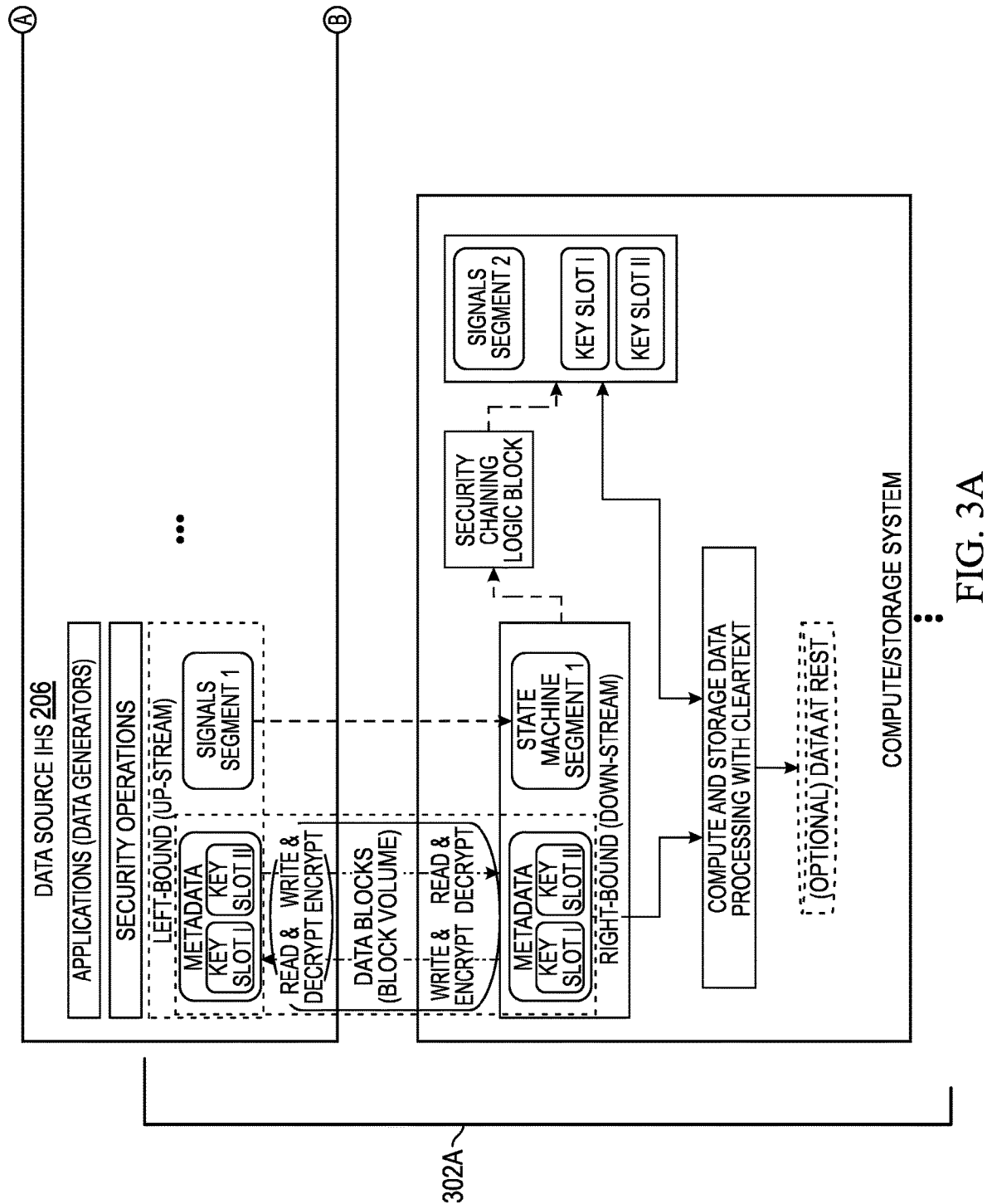
FIGS. 3A and 3B are partial views intended to form one complete view of a block diagram of an IHS network environment showing multiple parallel end-to-end efficient encryption with security chaining of multiple segment chains, according to some embodiments.
Figure 3B:
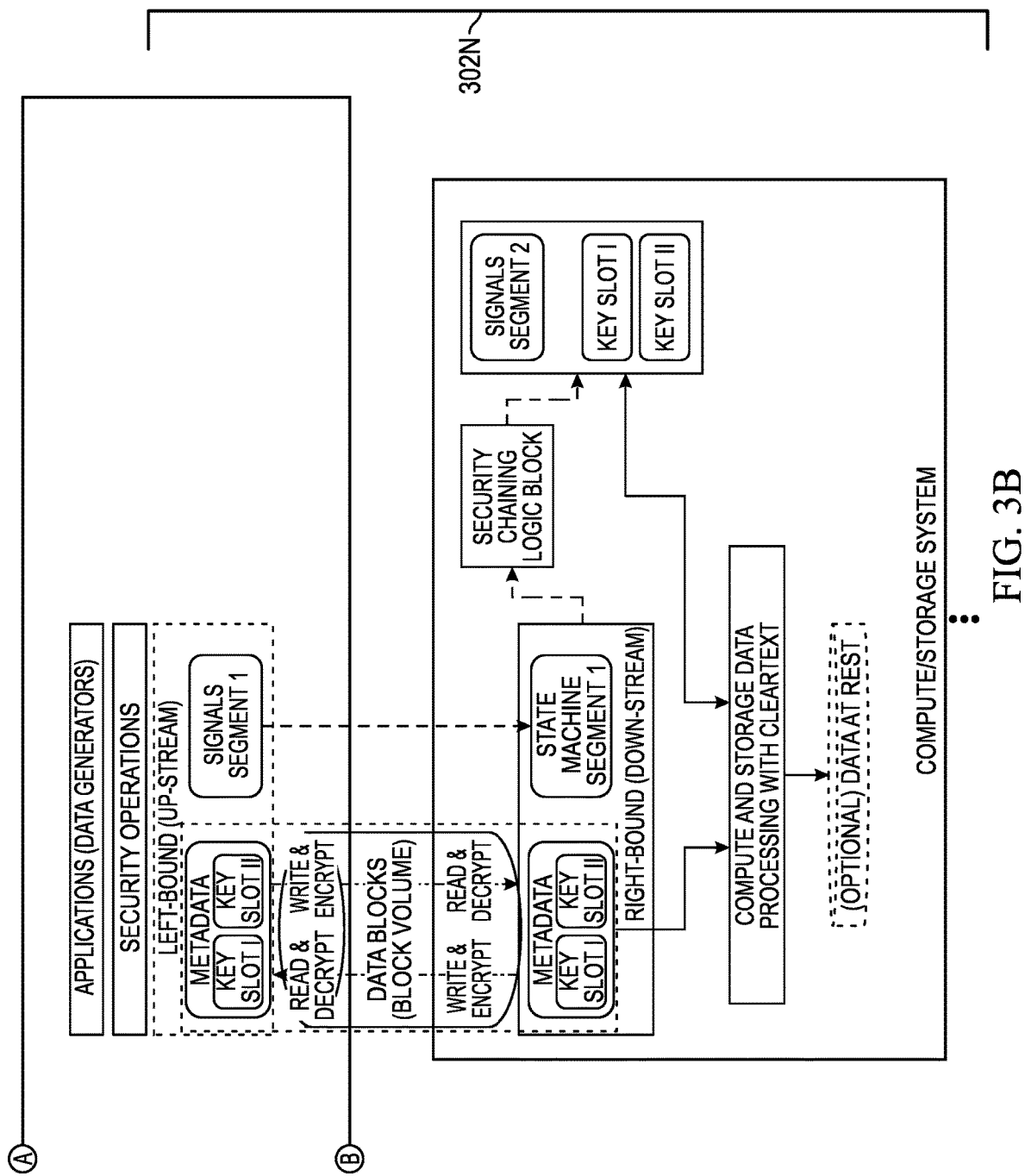

Embodiments of the present systems and methods may (also) support multiple segment chains with single data source IHS. FIGS. 3A and 3B are partial views intended to form one complete view of a block diagram of IHS network environment 300 showing multiple parallel end-to-end efficient encryption with security chaining (e.g., of multiple (serial) segment chains 302a-n), according to some embodiments.

In accordance with the foregoing, metadata 226 and handshake signals 222 are handled as follows. With respect to in-band metadata 226, data-source IHS 206 reads and writes metadata 226. Any other compute or storage IHS down the data path chain (e.g., 208a through 208n) only reads metadata 226. In other words, metadata 226 is created and updated by the data source IHS 206 only. In accordance with embodiments of the present systems and methods, E2EEE metadata 226 should, by way of example, include the following.

Volume metadata describes the protected data object and should, by way of example, include: an encryption identifier ("magic" or signature of the metadata); a volume universally unique identifier (UUID) (e.g., a 128-bit label), encryption type and/or capability, an encryption mode; etc.; and reserved space or alignment padding (to isolate volume metadata and encryption metadata I/O blocks, etc.).

Encryption metadata should, by way of example, include: E2EEE state machine input; encryption parameters (2 copies for rekey and state machine transitions), including KEK properties: UUID, algorithm and control info, (optional) Intermedium Key (IK (or MK)) for protection (KEK could be used as IK in some embodiments) and encrypted DEK cryptographically processed control information; (optional) data-source private (e.g., data-source system internal use of different encryption engines); (optional) other systems private (e.g., a replication handshake, etc.); and reserved space and padding.

Metadata protection should, by way of example, include: integrity control with authenticated checksum (e.g., a Hash-Based Message Authentication Code (HMAC), or the like); version control (modification time, sequence number etc.); and E2EEE segment configuration state control with designated data block content verification, or the like.

Metadata Area in the Data Volume:

| Size | Name | Description |
| --- | --- | --- |
| 4K | Metadata Header | See a table below |
| 4K | Crypt Header Slot 1 | See a table below |
| 4K | Crypt Header Slot 2 | See a table below |
| 128K | Workspace | Used by data-source IHS for re-encryption, crypt header editing etc. |
| TMS-128K-128K-16K | Reserved | Not used in this version |
| 16K | Secondary GPT Table | Located at the last 16K of the device |

* TMS—total metadata size

Metadata Header:

| Size in bytes | Name | Description |
| --- | --- | --- |
| uint8[8] | Header Magic | Also identifies a version of the header format |
| uint8[16] | Volume ID | Volume GUID |
| uint16 | Crypt Header Type | 1 - Linux host, 2 - Windows host |
| uint16 | Crypt Header Slot | Active slot number:<br>0 - None (initial state, no accepted crypt header in either slot)<br>1 - Slot 1 (crypt header in slot 1 is actively used)<br>2 - Slot 2 (crypt header in slot 2 is actively used) |
| uint16 | Crypt Header Size | Actual header size in the active slot in bytes, not including the zero padding |
| uint8[4] | Crypt Header 1 Checksum | CRC32 sum of the Crypt Header in slot 1. |
| uint8[4] | Crypt Header 2 Checksum | CRC32 sum of the Crypt Header in slot 2. |
| uint64 | Data Offset (0 based) | Offset of the encrypted data area, in 512-byte blocks starting from the beginning of the device |
| uint64 | Data Size | Size of the encrypted data area, in 512-byte blocks |
| uint16 | State | Used by the data-source IHS to persist intermediate states of the volume initialization. This allows the initialization to be resumed if it was interrupted. |

-continued

| Size in bytes | Name | Description |
|---|---|---|
| | | 0 - Uninitialized (initial state, no crypt header in either slot)
1 - Ready (volume is fully initialized; metadata is consistent and not in transition)
2 - Use Slot 1 (crypt header candidate written to slot 1)
3 - Use Slot 2 (crypt header candidate written to slot 2) |
| uint8[32] | Authenticated Checksum (covers Metadata Header from offset 0 to the beginning of the Authenticated Checksum) | hmac-sha256 of the metadata using the active Crypt Header Slot KEK |
| uint8[ ] | Reserved/Padding | Zero Padding to 4096 bytes |

Note:
Extra device data, e.g., Source device WWN, Device capability, Array supported encryption algorithms, etc. may be added to the metadata in place of zero padding.

Crypt Header:

| Size | Name | Description |
|---|---|---|
| uint16 | Data encryption algorithm (encrypted by DEK) | "0" = AES-XTS-256 (default) "others" TBD |
| uint8[16] | KEK ID | KEK Identifier |
| uint8[12] | IK Nonce | Nonce used for AES-CCM encryption of the IK material |
| uint8[16] | IK MAC | MAC of the IK material |
| uint8[32] | IK Data | IK material, AES-CCM encrypted with KEK |
| uint8[12] | DEK Nonce | Nonce used for AES-CCM encryption of DEK material |
| uint8[16] | DEK MAC | MAC of DEK material |
| uint8[64] | DEK Data | DEK material, AES-CCM encrypted with IK |
| uint8[ ] | Windows host specific key data | Windows only, zeroes for other types of hosts |
| uint8[ ] | Reserved/Padding | Zero Padding to 4096 bytes |

Encryption Keys Specifications:

| Key Name | Key Size (bits) | Protection |
|---|---|---|
| KEK (Key Encryption Key) | 256 | Key store protected |
| IK | 256 | AES-CCM encrypted with KEK |
| DEK (Data Encryption Key) | 512 | AES-CCM encrypted with IK |

Metadata protection may be provided by an IK for metadata protection and in accordance with embodiments of the present systems and methods, metadata has integrity checksum, with integrity of the checksum. Also, in accordance with embodiments of the present systems and methods, critical metadata is protected. Metadata protection is also provided by the IK being internal to metadata 226 creation and validation (e.g., in data-source IHS host 206).

Volume UUID generation and regeneration may include the data-source (e.g., in data-source IHS host 206) generating the volume UUID and saving it in metadata 226 when the volume transits from the unencrypted to encrypted state, as discussed below. The data-source (206) may (also) optionally regenerate the volume UUID and save it and old UUID(s) on metadata 226, such as when (or if) the volume is a mounted snapshot, a linked volume, a replica (e.g., 228), or the like. Thereby, metadata 226, as implemented in accordance with embodiments of the present systems and methods, provides a mechanism to distinguish the original data volume from a mounted snapshot, linked volume, replica (228) or the like. For example, data-source IHS 206 may compare a device physical ID saved in metadata 226 with current device physical ID as currently reported for the data in question and may consider a mismatch as a cloned volume case, or the like. When data-source IHS 206 regenerates the volume UUID, the data-source IHS also updates and/or adds the new native device physical ID in metadata. Thusly, the volume becomes a new source (original) volume.

For handshake signal over control channel implementation, each handshake signal 222 carries the following state info:

| Parameter | Description | Default Value | Initiator Access | Target Access |
|---|---|---|---|---|
| Use Slot | Set by initiator to 1 or 2 to indicate the Crypt Header Slot that should be used by the target. It represents a desired configuration. | 0 | read/write | read |
| Active Slot | Crypt Header Slot number (1 or 2) that is currently used by the target. It represents the actual configuration. The value 0 indicates no active configuration. | 0 | read | write |
| Config Error | Set by the target to an error code if target failed to reach the desired configuration which is set in Use Slot. Set to 0 before starting a configuration process. | 0 | read | write |

Error Code Descriptions:

| Error Code | Description |
|---|---|
| 0 | No error |
| 01h | Generic error |
| 02h | Metadata read/decode error |
| 03h | KEK request error |
| 04h | DEK unwrap error |
| 05h | Invalid Data Offset or Data Size |

A handshake (signals 222) implementation example, using SCSI commands may: use "INQUIRY" command to retrieve generic volume parameters, such as capacity; use "MODE_SELECT" to set volume parameters, such as on a vendor-specific page; use "MODE_SENSE" to read volume parameters, such as on a vendor-specific page; and/or uses "Mode Vendor Specific: page "20 h," as follows:

| Byte | Bit | | | | | | | |
|---|---|---|---|---|---|---|---|---|
| | 7 | 6 | 5 | 4 | 3 | 2 | 1 | 0 |
| 0 | PS (0) | | | | Page Code (20 h) | | | |
| 1 | Parameter List Length (02 h) | | | | | | | |
| 2 | Reserved | | | | Active Slot | | Use Slot | |
| 3 | Config Error | | | | | | | |

Figure 4:
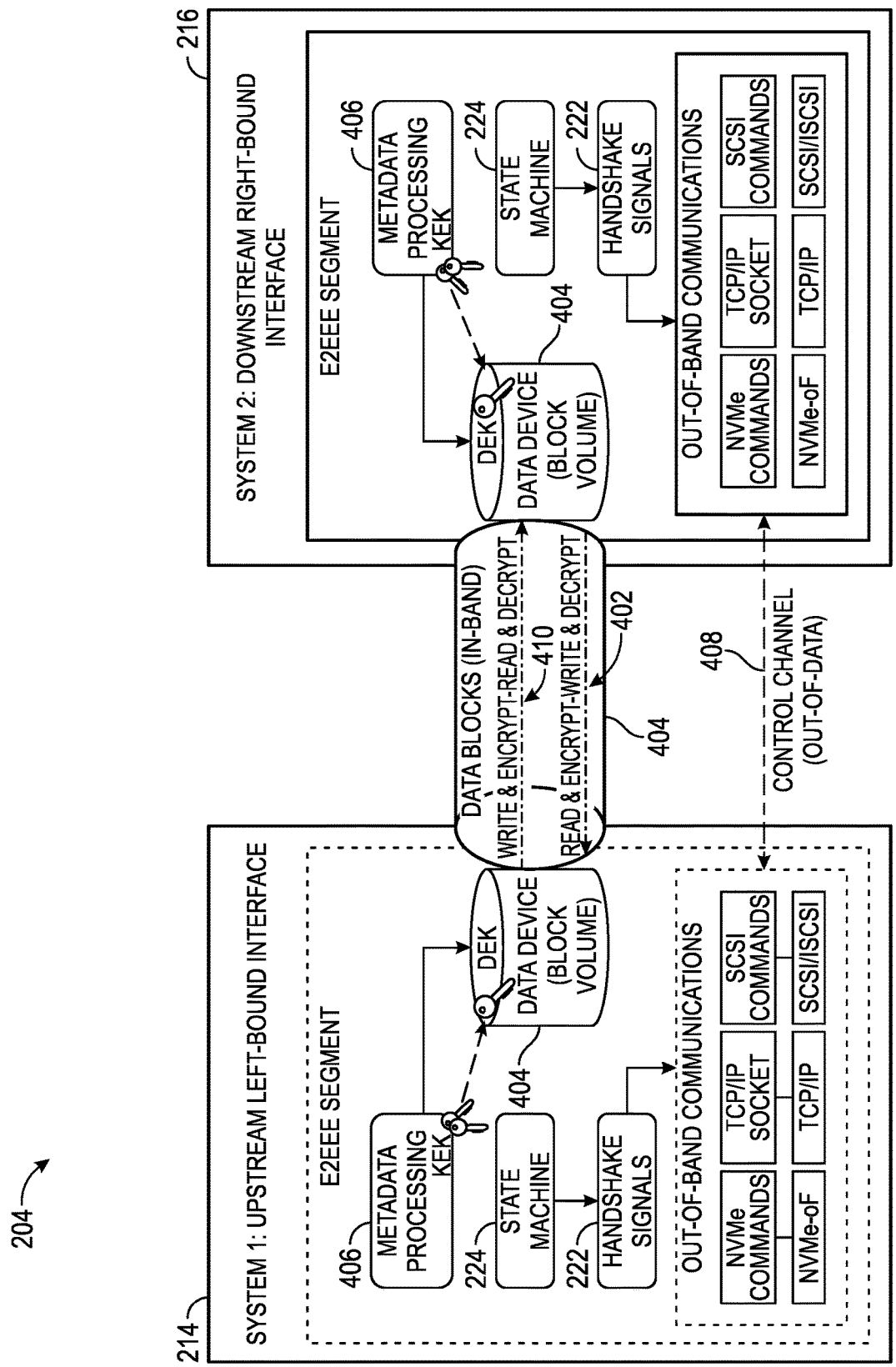
FIG. 4 is a block diagram of an example end-to-end efficient encryption segment, according to some embodiments.

FIG. 4 is a block diagram of example end-to-end efficient encryption segment 204, showing functions therein, according to some embodiments. With respect to communications for encryption control in accordance with embodiments of the present systems and methods, in-band metadata 226 is persistent on the data volume (e.g., SCSI LUN volume, Non-Volatile Memory express (NVMe) volume, or the like). Out-of-band (or out-of-data) handshake signals 222 are encryption control signals carried on networking protocols, such as SCSI/iSCSI commands, NVMe commands, Transmission Control Protocol/Internet Protocol (TCP/IP) connection, or the like. Handshake signals 222 are also "out-of-data" in that they are not part of the (encrypted) data volume, unlike metadata 226, which is generated in a trailer of an (encrypted) data volume.

As shown in FIG. 4, tasks performed on upstream, left-bound interface 214 may include: intercept 402 the write to data volume 404 and encrypt the data; intercept the read and decrypt data; metadata processing 406, which includes building and updating encryption metadata 226 at the end of data volume 404 that defines the encryption of volume 404 (e.g. slot I 218 or slot II 220); exchange 408 handshake signals 222 with the connected storage for encryption enablement or disablement, rekey, and other security operations and perform security operations for data volume(s) 404. Such security operations for the data volume(s) may include creation of a new empty volume, maintenance of an existing encrypted volume mounted to the host IHS; existing data encryption and/or decryption, such as, data transition from unencrypted to encrypted and from encrypted to unencrypted; shallow rekeying (as described below); or deep rekeying (as described below). Tasks performed on downstream, right-bound interface 216 may include intercept 410 the write from the host (206) and decrypt data 404; intercept 410 the read from the host (206) and encrypt data 404; metadata processing 406 to detect and read metadata 226 at the end of the data volume 404 that identify the encryption (e.g. slot I 218 or slot II 220); exchange 408 handshake signals 222 for encryption enablement or disablement, rekey, and other security operations (such as described below).

Figure 5:
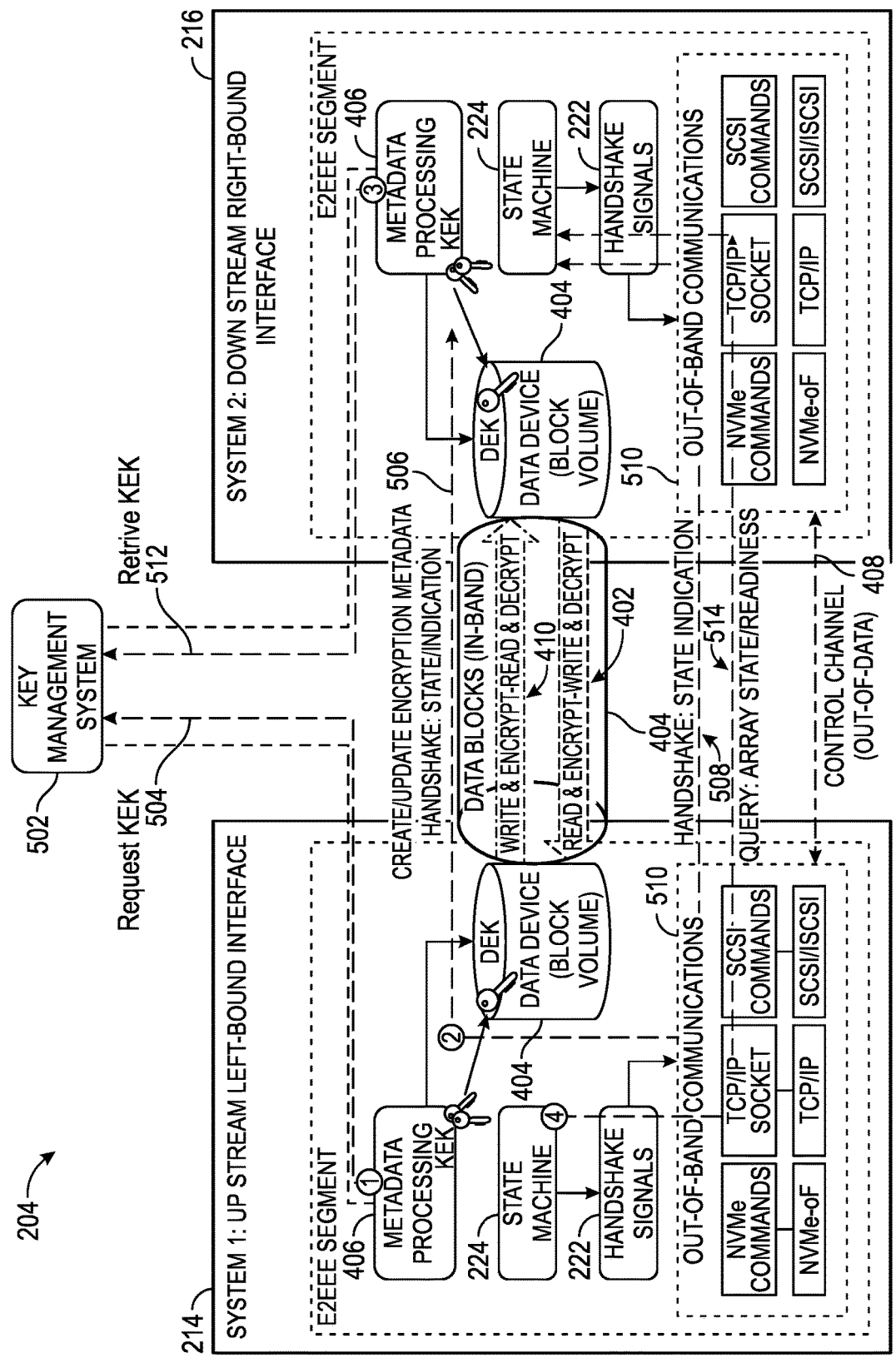
FIG. 5 is a block diagram of the example end-to-end efficient encryption segment of FIG. 4, showing communications within the segment, according to some embodiments.

FIG. 5 is a block diagram of the end-to-end efficient encryption segment of FIG. 4, showing communications within example segment 204, according to some embodiments. Therein, communication steps 504 through 514, are described below, between the host IHS (upstream, left-bound interface 214) and storage (downstream, right-bound interface 216 are shown), at a high level. Key Management System (KMS) 502 may be external to IHSs 206 through 208n in segment chain 202, as shown. KMS 502 generates and stores KEKs. KMS 204, may, in accordance with various embodiments of the present systems and methods, KMS be a process that is hosted by an IHS, or the like and may be full-time network-accessible to each E2EEE segment 204. For example, KMS 502 may be a Key Management Interface Protocol (KMIP) server, a cloud based Key Vault or Manager, or the like, and each segment 204 may communicate with the KMS to obtain the KEK. For example, in accordance with embodiments of the present systems and methods, upstream, left-bound interface 214, requests (504) the KEK from KMS 502. Upstream, left-bound interface 214 then initiates security actions and communications with storage, by creating and updating encryption metadata 226 and handshake indications in the metadata (506) and sending (508) handshake signals via out-of-band communications 510. Right-bound (downstream) interface 216 retrieves (512) the KEK from KMS, unwraps the DEK and performs security actions by following encryption metadata 226 and handshake signals 222, thereby the current storage (i.e., down-stream, right-bound interface 216) may perform security chaining communications with next storage interface. Upstream, left-bound interface 214 then queries (514) right-bound (down-stream) interface 216 concerning states and/or status, via out-of-band communications 510 to complete security operations, such as enablement or disablement, rekey, etc.

Figure 6:
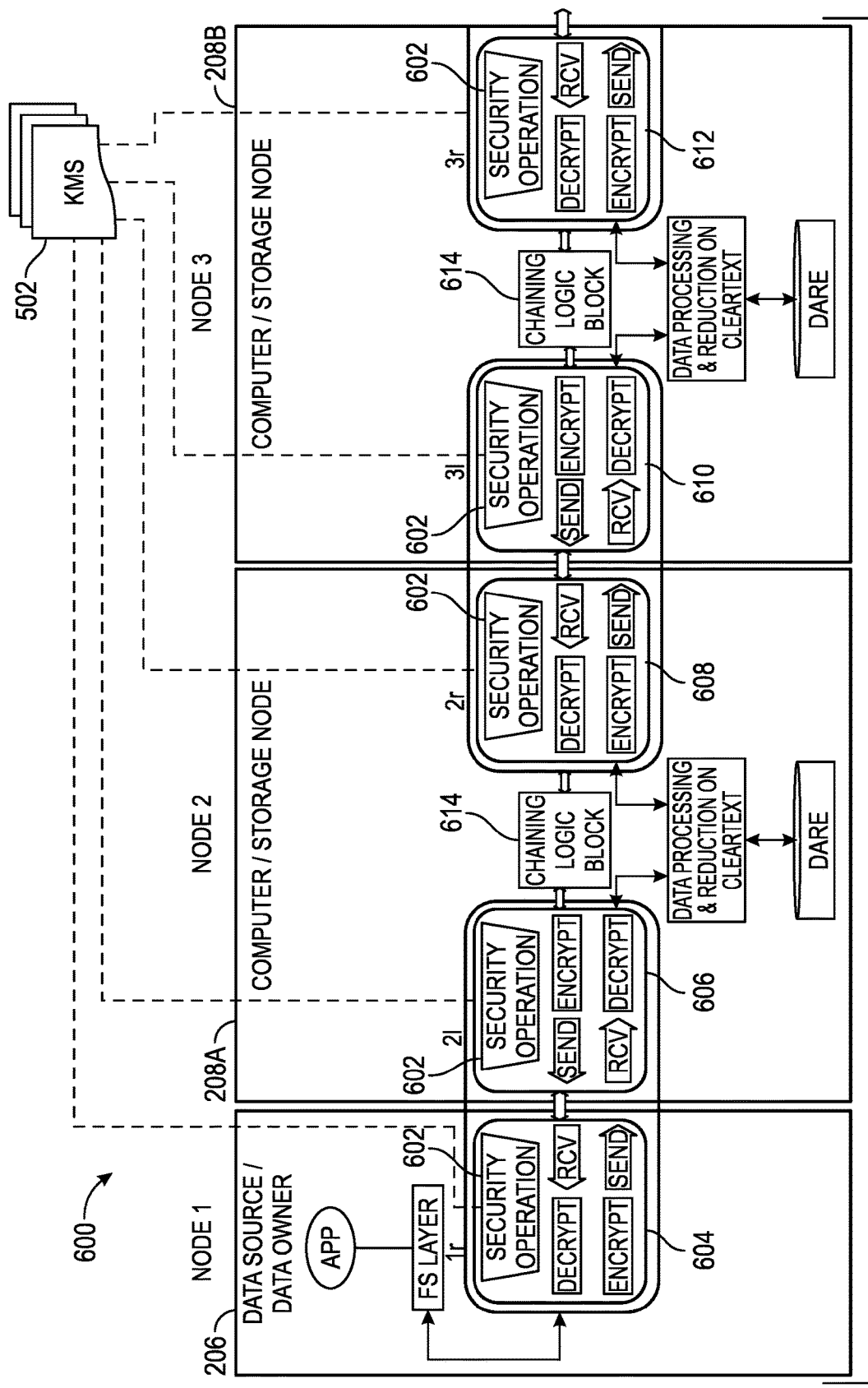
FIG. 6 is a block workflow diagram of end-to-end efficient encryption security chaining, according to some embodiments.

FIG. 6 is a block workflow diagram of end-to-end efficient encryption security chaining 600, according to some embodiments. In accordance with embodiments of the present systems and methods, security chaining 600 takes place within the same IHS, and is the segment relay between right-bound interface communications to left-bound interface communications and between left-bound interface communications to right-bound interface communications.

In accordance with E2EEE security chaining under embodiments of the present systems and methods, in-band metadata 226 is not changed other than by the originator (e.g., data-source IHS 206). Such metadata changes by the originator are inherently, in accordance with embodiments of the present systems and methods, propagated down the chain. Also, in accordance with E2EEE security chaining under embodiments of the present systems and methods, every IHS within the same security chain is responsible for performing handshakes (i.e., handshake signaling 222) with its right-bound neighbor and for suspending downstream I/O until the handshake is completed. Handshake signals 222 trigger state machine (224) transitions. As noted, handshake signals 222 are communicated between right and left-bound interfaces (IHSs) of each E2EEE segment via out-of-band (out-of-data) control channel, such as SCSI commands, NVMe commands, and TCP/IP connection messages.

Also, under security chaining 600, all security operations (e.g., enable or disable encryption, shallow and/or deep rekey, etc., described below) follow the same handshake procedures across chain 202. Thereunder, security operation 602 is initiated by data-source IHS 206, as depicted in the FIG. 6. Node 1 (data-source IHS 206) and node 2 (IHS 208a) synchronize the handshake signals (222) between 1r 604 (right endpoint (of a left-bound (up-stream) interface 214)) to 2l 606 (left endpoint (of a right-bound (down-stream) interface 216)). Node 2 (IHS 208a) and node 3 (IHS 208b) synchronize the handshake signals (222) between 2r 608 (right endpoint (of a left-bound (up-stream) interface 214)) to 3l 610 (left endpoint (of a right-bound (down-stream) interface 216)). Node 3 (IHS 208b) and node 4 (not shown (IHS 208c)) synchronize the handshake signals (222) between 3r 612 (right endpoint (of a left-bound (up-stream) interface 214)) to 4l (not shown, left endpoint (of a right-bound (down-stream) interface 216)). This continues until the last E2EEE segment in the chain (202).

Chaining logic block 614 in each node handles the handshake (222) changing synchronization between the left E2EEE segment and the right E2EEE segment on each node (i.e., between 2l 606 and 2r 608, and between 3l 610 and 3l 612). The keys, KEK provided via KMS 502, and the DEK derived therefrom and stored in the metadata (226), are used for the encryption and decryption across the chain (202) and are each the same. All security operations under embodiments of the present systems and methods are instant or fast, since only the metadata (226), handshake signals (222), and state machines (224) are synchronized, there is no need to encrypt and/or decrypt the actual storage data, since the operations only apply to the I/O path between each segment.

Figure 7:
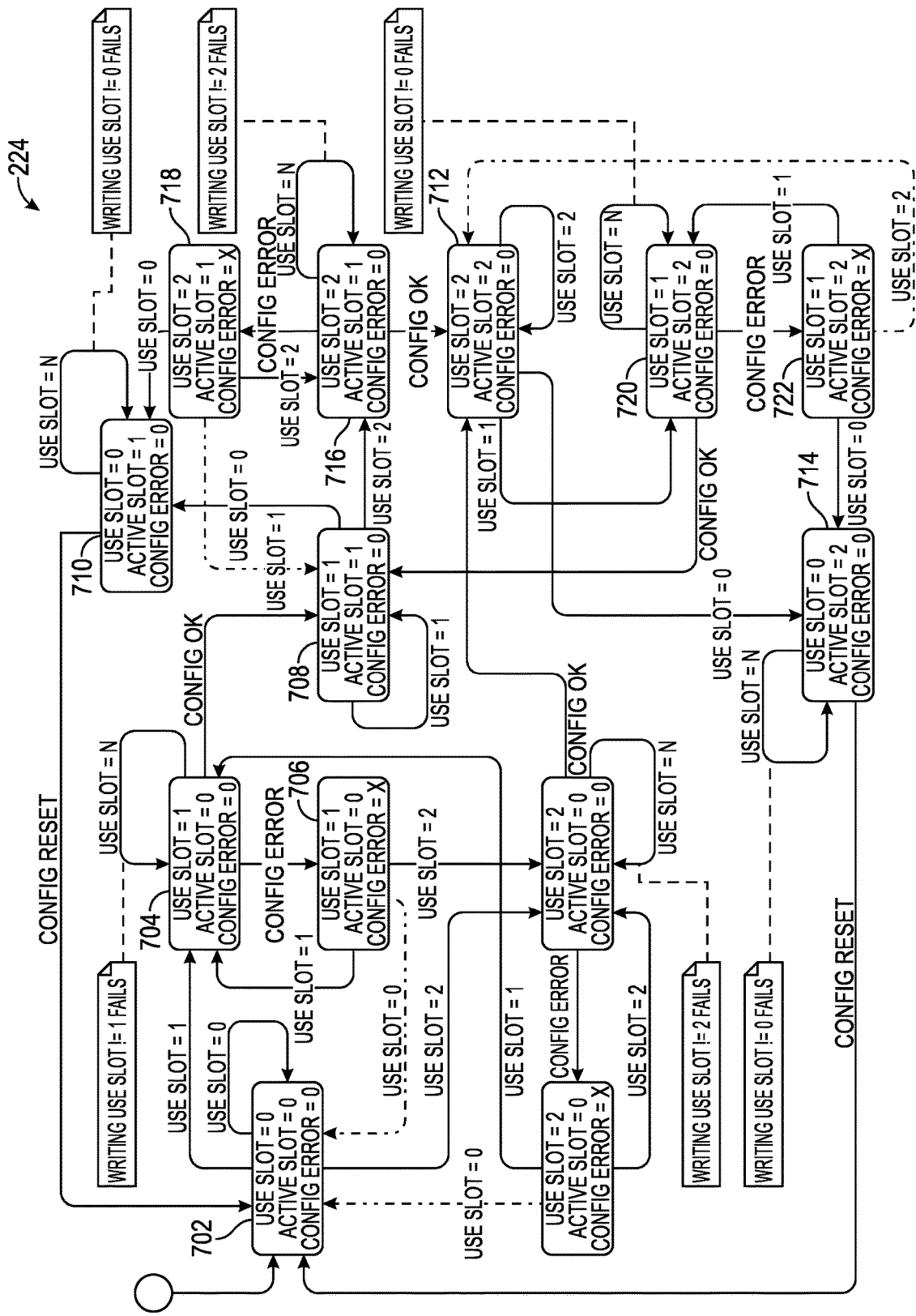
FIG. 7 is a diagram of a (complete) compute host and/or storage IHS state machine for end-to-end efficient encryption with security chaining, according to some embodiments.

State machine(s) 224 is (are) discussed in greater detail below with respect to enablement and disablement of encryption, and shallow and/or deep rekeying. However, FIG. 7 is a (complete) compute host and storage IHS state machine diagram for end-to-end efficient encryption with security chaining, according to some embodiments, showing states 702 through 722 discussed below. The handshake process is based on state machine 224, for which, the inputs are the in-bound metadata (226) and the handshake signals (222) from the left-bound (up-stream) interface 214, wherein the states reflect the left-bound E2EEE segment encryption configuration. Security chaining 600 provides data path High Availability (HA) for dynamically connecting multiple right-bound IHSs 208a-n. The data blocks are replicated to all downstream IHSs 208a-n in accordance with embodiments of the present systems and methods. This enables replacement of an IHS, transparently, and/or enables implementation of data path redundancy (228).

Security operations in embodiments of the present systems and methods include enabling and disabling of encryption of data, shallow (KEK) and deep (DEK) rekeying, etc., for all segments (204) in the data path (202) Embodiments of the present systems and methods have the following characteristics for all security operations. Any operation, from initiation to completion, involves only processing of control information. The control information includes metadata 226, handshake signals 222 for every E2EEE segment 204 in data path 202, and state machines 224 of both endpoints for every E2EEE segment 204. Since only control information is processed for every operation, any operation can be completed instantly or in a very short time. Also, in accordance with embodiments of the present systems and methods, any operation is agnostic to data volume size, and the like.

Figure 8A:
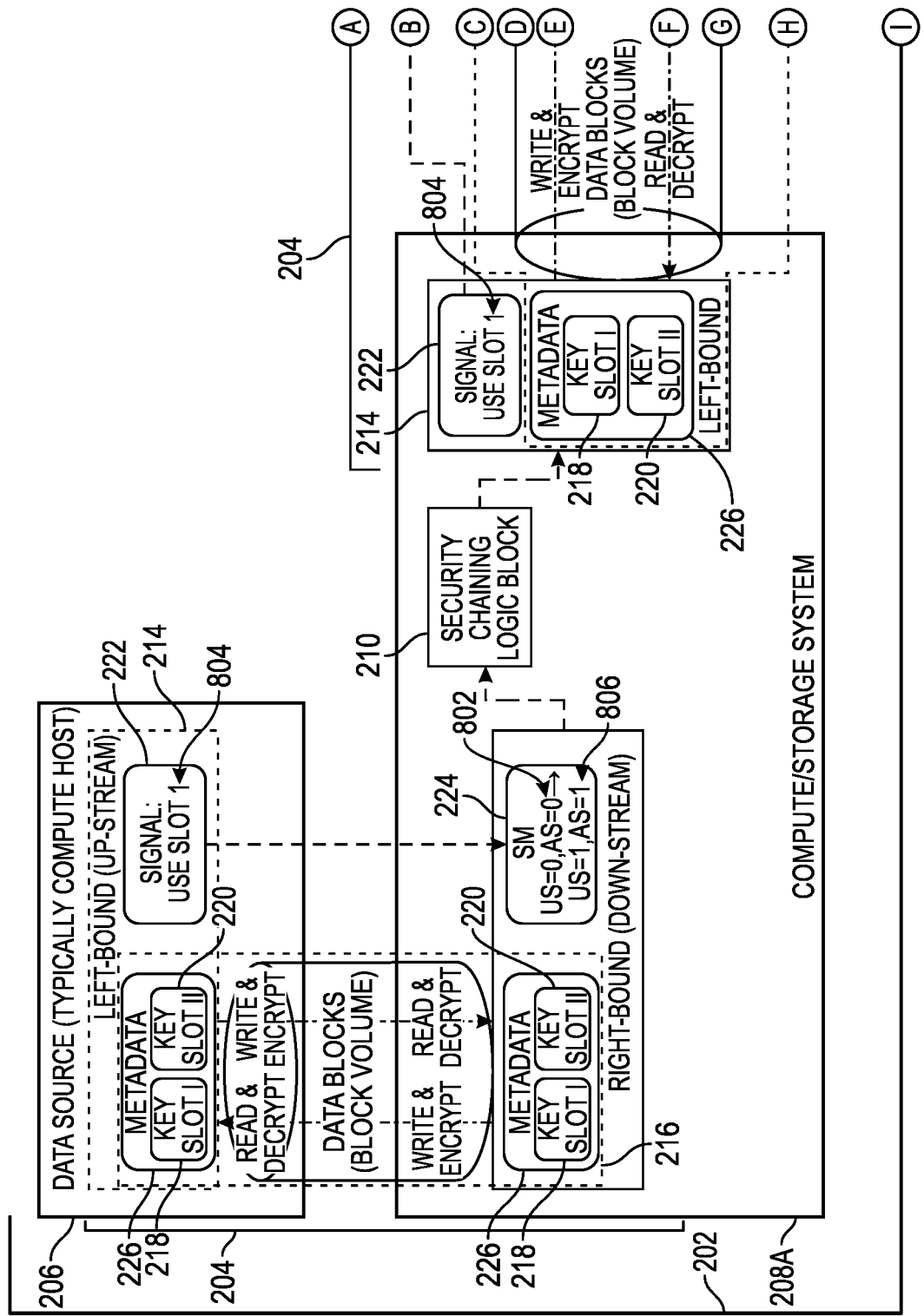
FIGS. 8A and 8B are partial views intended to form one complete view of a block diagram of an IHS network environment showing enablement of end-to-end efficient encryption with security chaining.
Figure 8B:
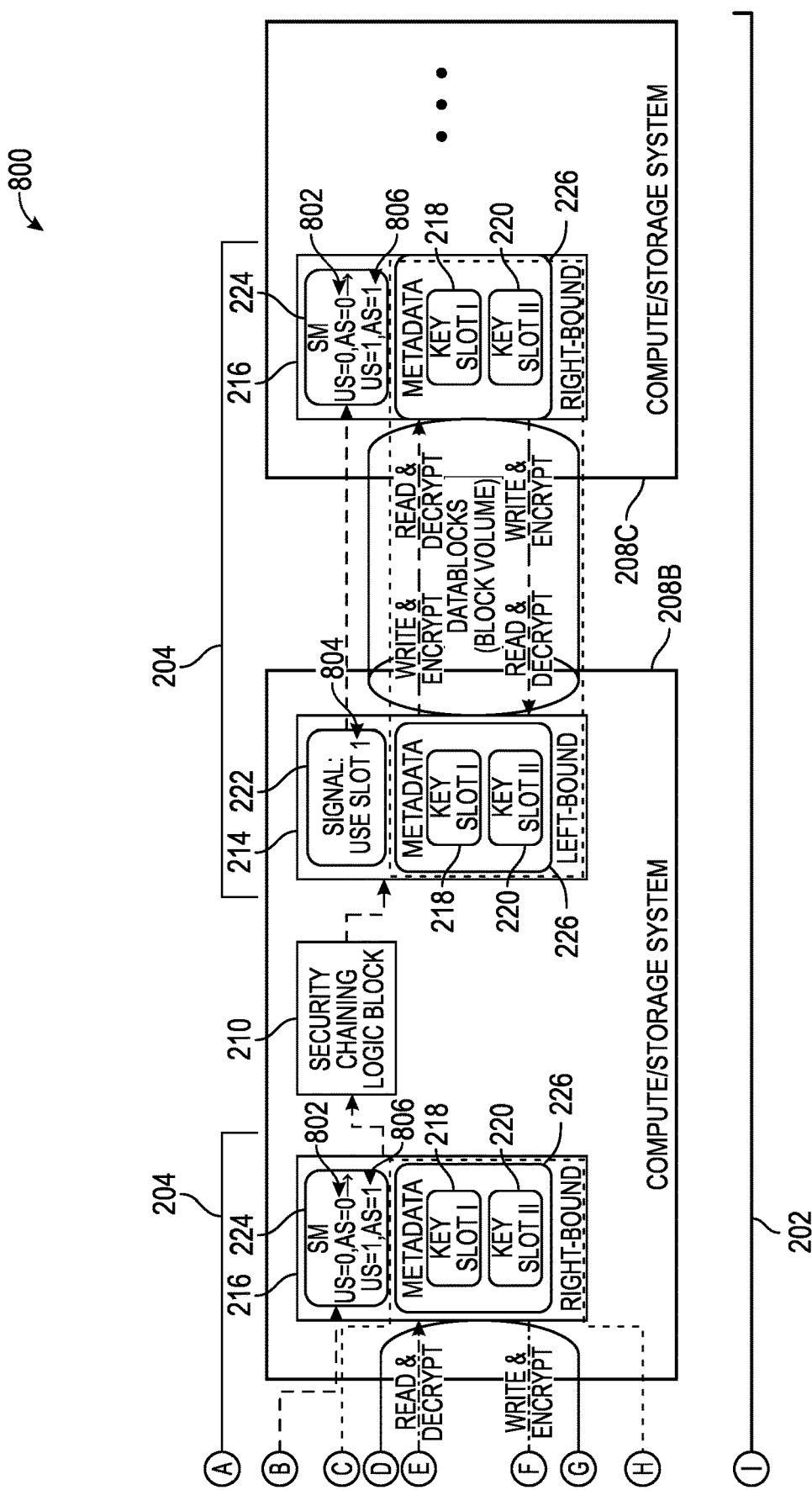
Figure 9:
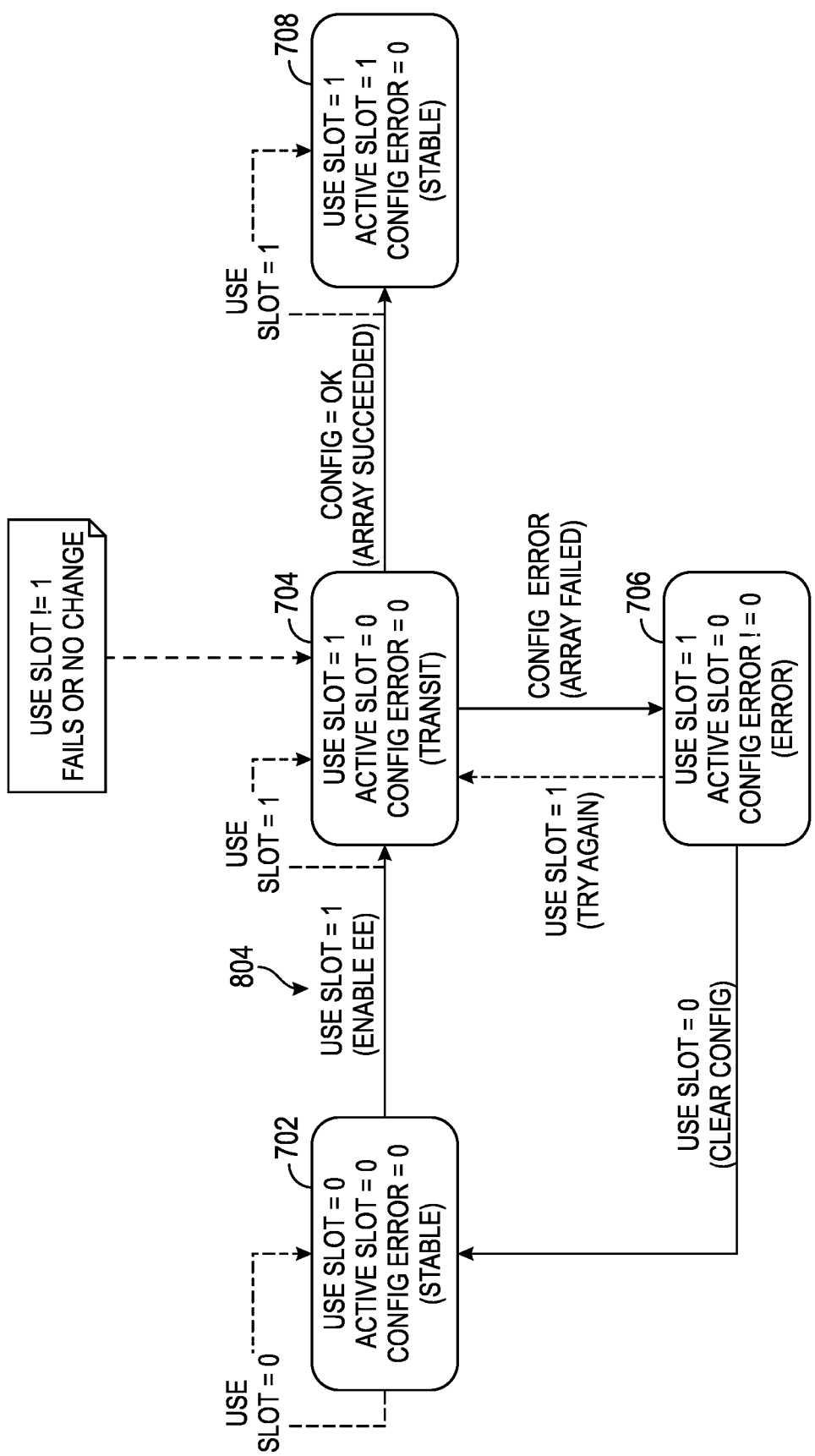
FIG. 9 is a state machine diagram for enablement of end-to-end efficient encryption with security chaining, according to some embodiments.

FIGS. 8A and 8B are partial views intended to form one complete view of a block diagram of an IHS network environment, such as of single (serial) segment chain 202 of FIGS. 2A and B, showing enablement 800 of end-to-end efficient encryption with security chaining, according to some embodiments. Therein data source (host) 206 will write metadata 226 containing and employing key slot I 218, or the like, in a trailer of a data block using the key slot. Security chaining 220, as discussed above, ensures metadata 226 remains unmutated (unchanged) to (the) down-stream segment(s). State machine 224 is set at an "initial state," herein US (use slot)=0, AS (active slot)=0 (802). FIG. 9 is a state machine diagram for enablement of end-to-end efficient encryption with security chaining, according to some embodiments, such as states 702 though 708 of FIG. 7, wherein 702 shows initial state US=0, AS=0. No actual encryption or decryption occurs in this regard.

Data Source (host) 206 then sends signal 222 (804) "Use slot I," or the like. Security chaining 220 regenerates signal "Use slot I" for next segment. State machine changes (806) from US=0, AS=0 (702) through US=1, AS=0 (704) to US=1, AS=1 (706). Security chaining, as discussed above, ensures this change occurs (backward) from (the last) segment to (the first) segment. Again, no actual encryption or decryption occurs in this regard.

Data source (host) 206 then starts writing/reading user data, all IHSs in the chain encrypt/decrypt user data (e.g., decrypt user data when accessed (read) and encrypts user data when added or changed (written)) otherwise data is sent between the segments in encrypted format. Thusly, security chaining, as discussed above, enables encryption and decryption (forward) from (the first) segment to (the last) segment, and encryption/decryption applies to all data writing and reading in the chain (202).

Figure 10:
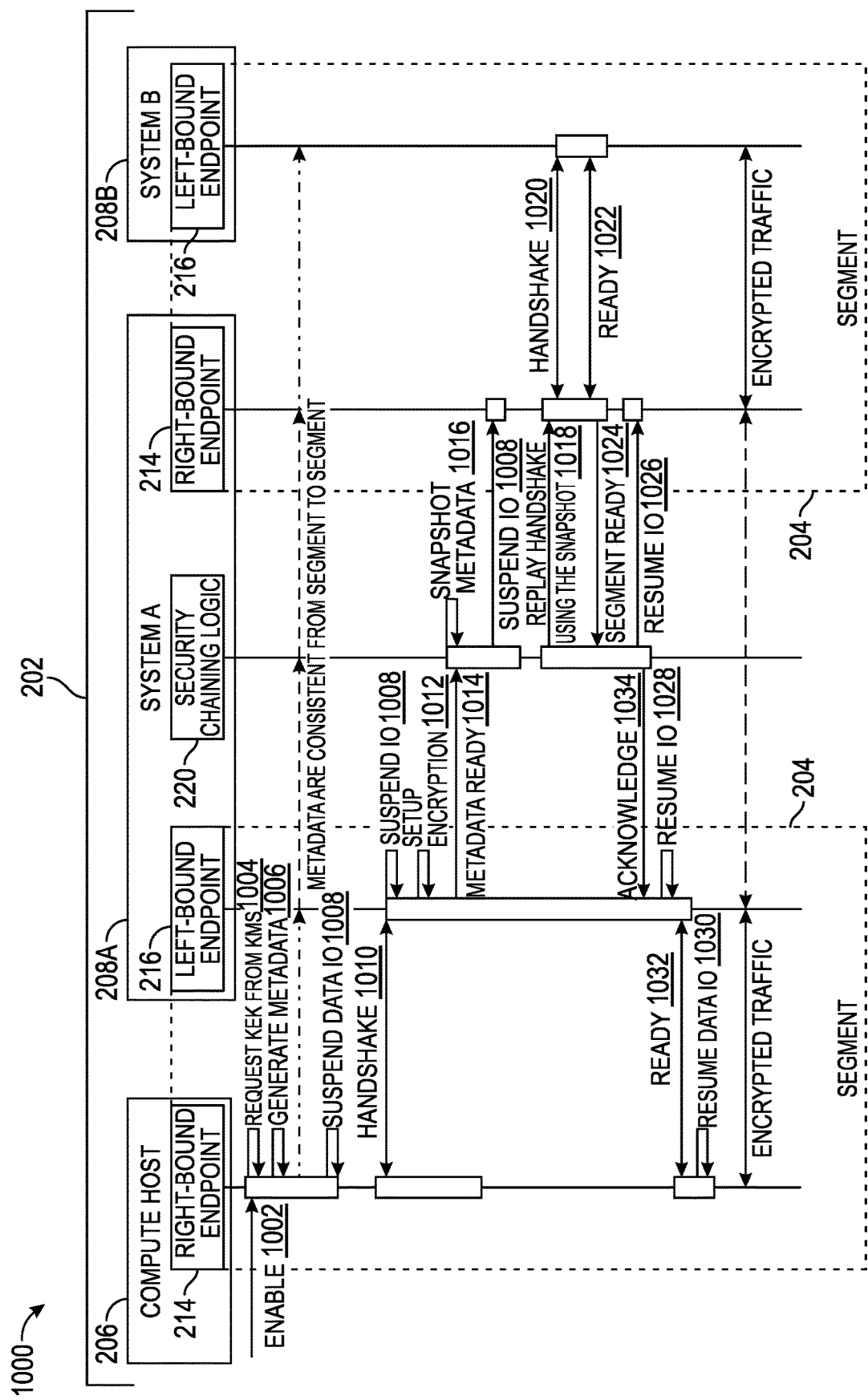
FIG. 10 is a swim lane workflow diagram showing enablement of end-to-end efficient encryption with security chaining, according to some embodiments.

FIG. 10 is a swim lane workflow diagram showing enablement 1000 of end-to-end efficient encryption with security chaining, such as of single (serial) segment chain 202 of FIGS. 2A and B, according to some embodiments E2EEE enablement 1000 is the procedure to enable volume EE (online transition from unencrypted to EE encrypted). The description below assumes the data volume to be encrypted has enough space for metadata 226 at the volume trailer. Enablement procedure 1000 covers both new and/or empty volume encryption and existing unencrypted data-set volume encryption.

Upon a request to enable encryption at 1002, an exchange of information with KMS for key (KEK) creation and distribution takes place. To identify the key (KEK), data-source IHS 206 requests a key from the KMS at 1004 and each of the IHSs in chain 202 retrieves the key. At 1006, data-source IHS 206 creates encryption metadata 226 at the trailer of the volume for which encryption is being enabled. For existing unencrypted data-sets volume encryption, if there is not enough empty space for metadata at the end of the volume, data-source IHS 206 may, in accordance with various embodiments of the present systems and methods, either shrink the volume or request storage to add extra space. The right-bound traffic should be suspended, at 1008, to prevent any (new) data to be transmitted insecurely downstream. The encrypted volume (OS-native) metadata and volume format are prepared. However, all metadata is generated at 1006 before enabling actual encryption, the actual data encryption is enabled independently from metadata creation and control, Also the encrypted volume is provided access to applications.

Handshakes for all E2EEE segments, beginning with handshake 1010, are completed. Handshakes (signals 222) are carried out via out-of-band (out-of-data) communications, (such as trough SCSI commands), as noted. This enablement procedure can be completed "instantly" (i.e., over a short period of handshaking time). There is no need to encrypt, or otherwise "walk-through" any existing data-sets.

Security chaining logic 220 is responsible for replication of encryption metadata 226 to the right endpoint(s) (left-bound interface(s) 214) as well as generating appropriate control signals 222 to coordinate reconfiguration of the right encryption endpoint with the left-bound encryption endpoint (right-bound interface 216) of the downstream IHS(s). Security chaining logic 220 will not propagate metadata changes until the left endpoint (right-bound interface 216) successfully finishes the handshake. That is, until both sides confirm re-configuration 1012, metadata state is "ready" at 1014. When the metadata is ready at 1014, chaining logic 220 makes a snapshot of the metadata at 1016 to memory and presents it to the right-bound endpoint (left-bound interface 214) as encryption metadata 226 at 1018. It then initiates right-bound handshake 1020, which is minimal, in accordance with the foregoing, since metadata 226 is in the ready state and does not need multistage updates accompanied by related control signals, or the like, as is typical.

In the case when the right-bound endpoint (left-bound interface 214) receives a metadata update 1018, chaining logic 220 should interrupt and roll back the right-bound handshake 1020 if there is one in progress and wait for the ready state metadata 1022, 1024 on the left-bound endpoint (right-bound interface 216). As noted, the right-bound traffic should be suspended 1008, before left-bound traffic is resumed at 1026 through 1030, to prevent any new data to be transmitted insecurely downstream until after compute host 206 has received a confirmation of the secure channel (i.e., ready 1032, via acknowledgement 1034).

The resulting encryption enablement in accordance with embodiments of the present systems and methods are compatible with IHS operating system full volume and block encryption features, supports empty volumes or volumes with data, data appears (i.e., is) encrypted (relatively) instantly, cloning and snapshots are supported, the same encryption function is employed in each segment and chain segments are replaceable.

Figure 11A:
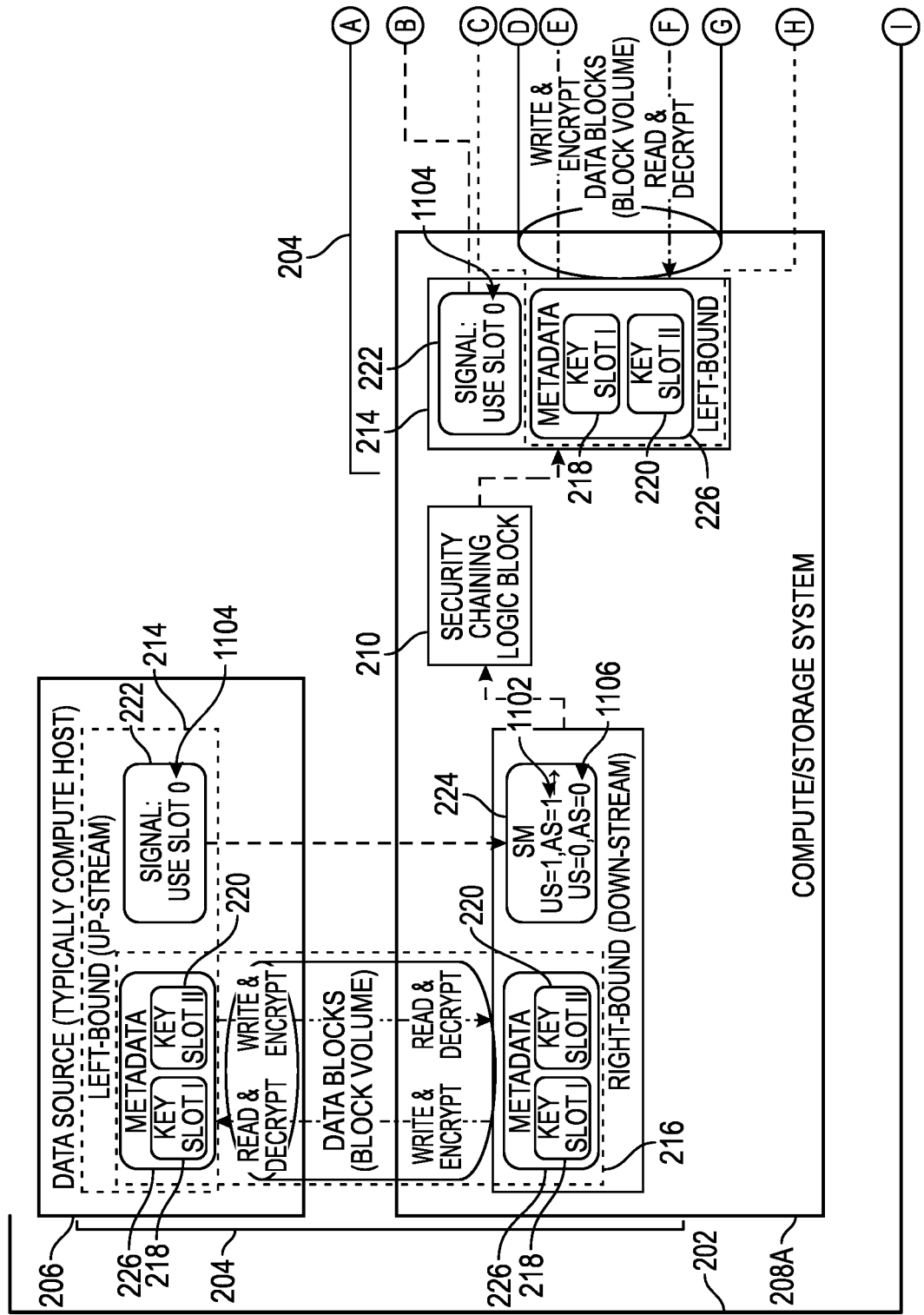
FIGS. 11A and 11B are partial views intended to form one complete view of a block diagram of an IHS network environment showing disablement of end-to-end efficient encryption with security chaining, according to some embodiments
Figure 11B:
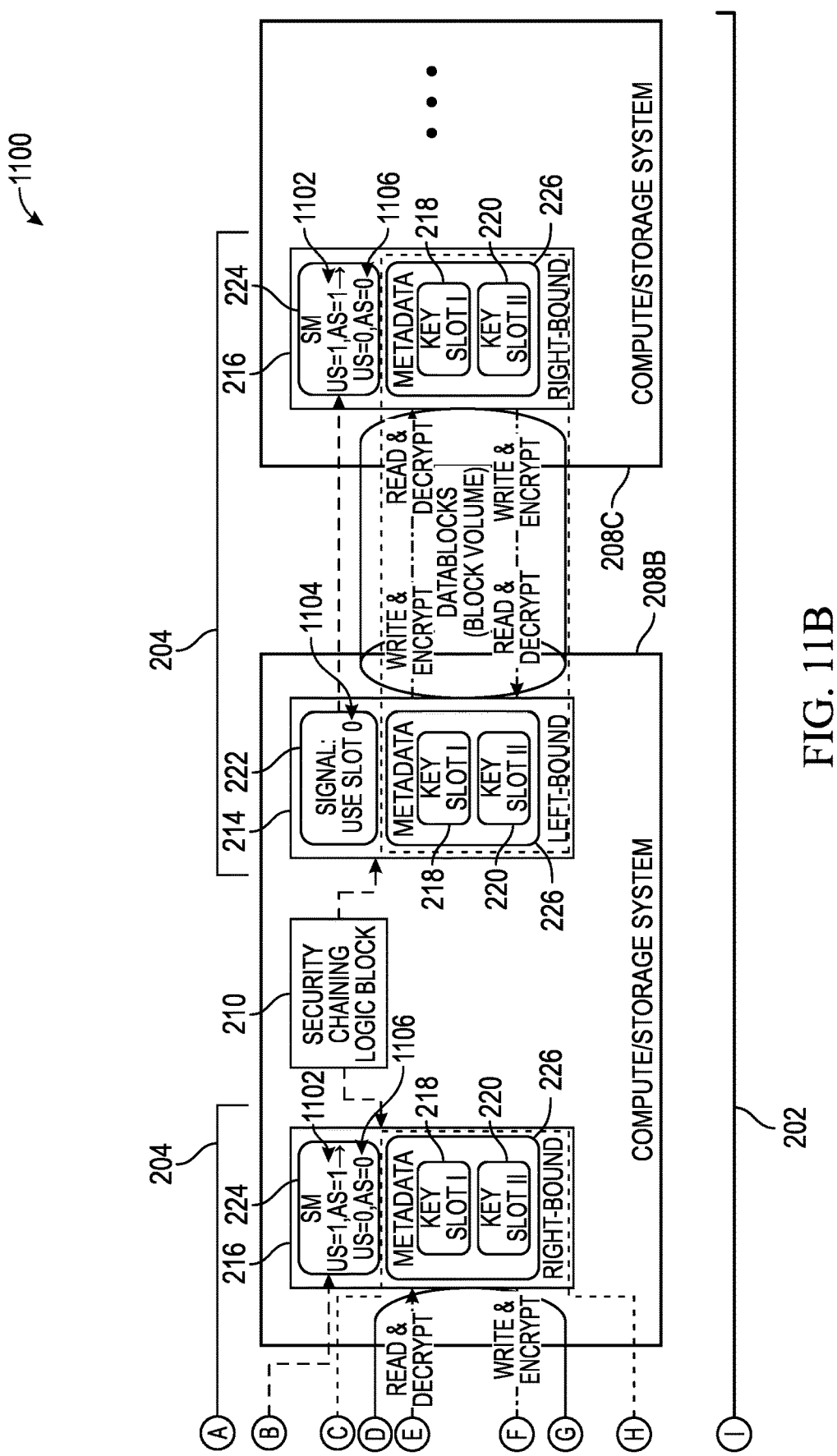
Figure 12:
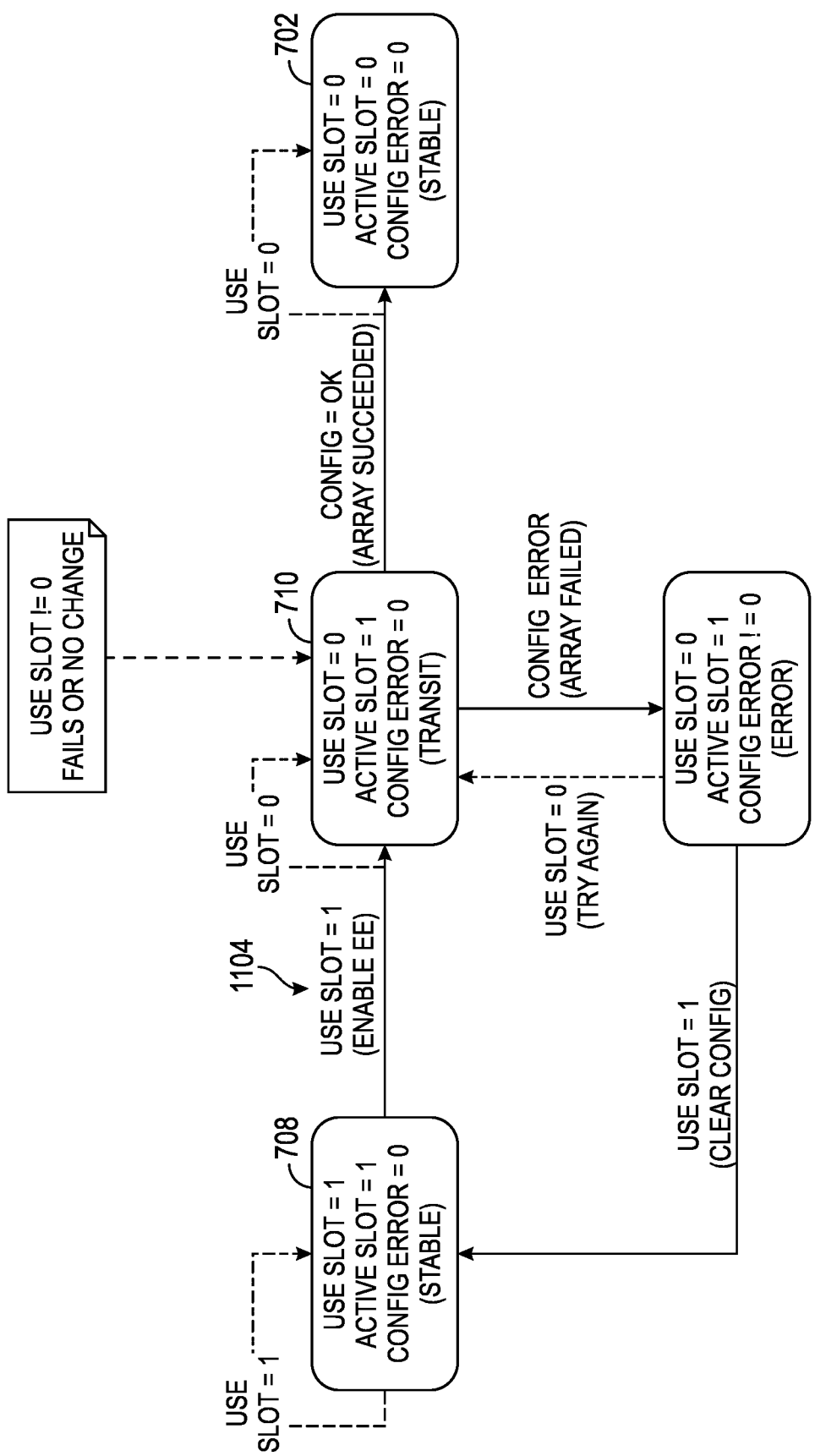
FIG. 12 is a state machine diagram for disablement of end-to-end efficient encryption with security chaining, according to some embodiments.
Figure 13:
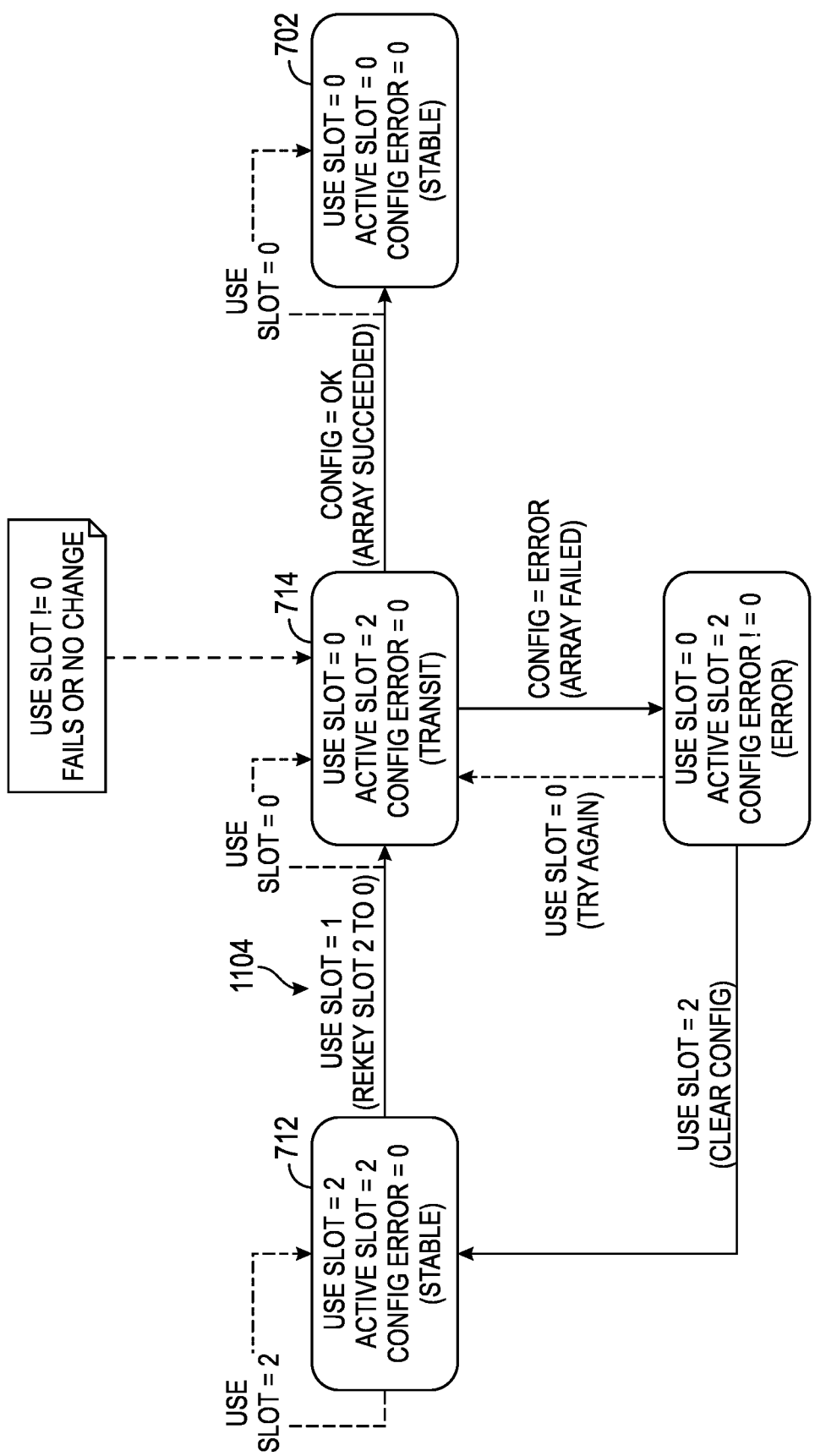
FIG. 13 is another state machine diagram for disablement of end-to-end efficient encryption with security chaining, according to some embodiments.

FIGS. 11A and 11B are partial views intended to form one complete view of a block diagram of an IHS network environment, such as of single (serial) segment chain 202 of FIGS. 2A and B, showing disablement 1100 of end-to-end efficient encryption with security chaining, according to some embodiments. FIG. 12 is a state machine diagram for disablement of end-to-end efficient encryption with security chaining, such as states 702, 708 and 710 of FIG. 7, wherein, 708 shows state machine 224 as set at a(n) (initial) state where US (use slot)=1, AS (active slot)=1, (1102) according to some embodiments. FIG. 13 is another state machine diagram for disablement of end-to-end efficient encryption with security chaining, such as states 702, 712 and 714 of FIG. 7, wherein, 712 shows state machine 224 as set at a(n) (initial) state where US=2, AS=2, according to some embodiments.

To begin disablement 1100 data source (host) 206 sends signal (222) "Use slot 0," at 1104. Security chaining 220 regenerates signal "Use slot 0" for the next segment (204), such that state machine 224 changes state from US=1, AS=1 (or US=2, AS=2, etc.) to US=0, AS=0 (at 1106). Security chaining 220 ensures this change is applied (backward) from (the last) segment to (the first) segment and as a result, encryption and/or decryption is no longer applied to data I/O. Then data Source (host) 206 removes metadata 226 and all data read by host 206 appears (i.e., is) unencrypted "instantly" (i.e., over a short period of handshaking time).

Figure 14:
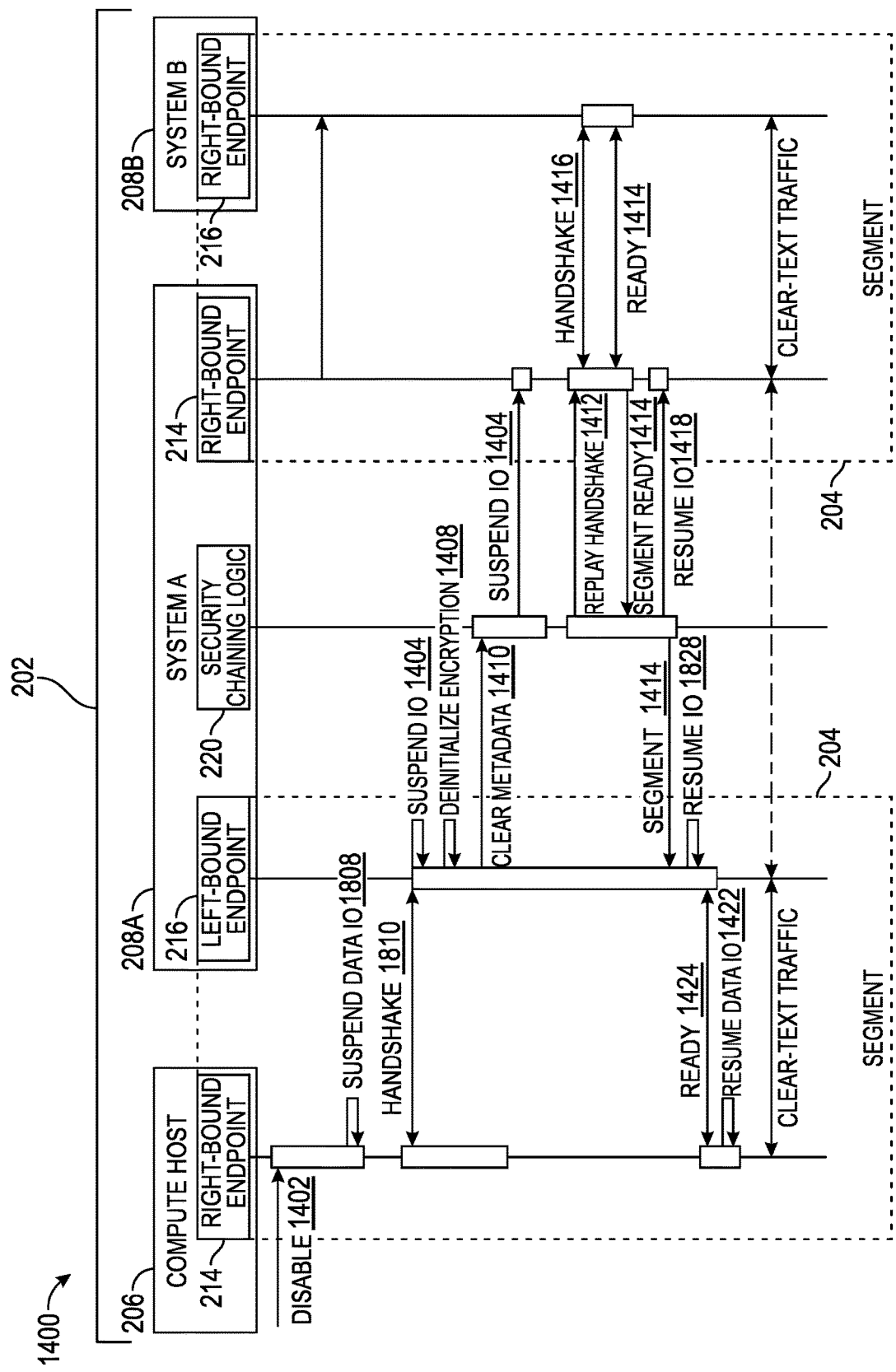
FIG. 14 is a swim lane workflow diagram showing disablement of end-to-end efficient encryption with security chaining, according to some embodiments.

FIG. 14 is a swim lane workflow diagram showing disablement 1400 of end-to-end efficient encryption with security chaining, such as of single (serial) segment chain 202 of FIGS. 2A and B, according to some embodiments. E2EEE disablement 1400 is the procedure to disable EE (online transition from EE to unencrypted). Encryption disablement procedure 1400 decrypts the encrypted volume in-place. Upon receipt of instruction 1402 to disable end-to-end efficient encryption, compute host 206 initiates update to metadata 226. The right-bound traffic should be suspended, at 1404, to prevent any (new) (encrypted) data to be transmitted downstream. Handshakes 1406 setting "Use slot 0" (US=0, AS=0 state) for all E2EEE segments 204 are completed), which results in I/O suspension 1404 and deinitialization of encryption 1408. Again, the handshakes (signals) 222 are carried out via out-of-band (out-of-data) communications, (such as SCSI commands Then sanitization (clearing) 1410 of encryption metadata is carried out, as described above. As noted, this disablement procedure can be completed "instantly" (over a short period of handshaking time) and there is no need to decrypt and/or "walk-through" any existing datasets.

Security chaining logic 220 is responsible for clearing the encryption metadata area presented to the right-bound endpoint ((left-bound interface 214), such as through reply 1412, as well as generating appropriate control signals 222 to coordinate reconfiguration of the right-bound encryption endpoint (left-bound interface 214) with the left-bound encryption endpoint (right-bound interface 216) of the downstream IHS(s). Security chaining logic will not clear the encryption configuration of the right-bound segment until the left-bound endpoint (right-bound interface 216) successfully disables encryption at 1408, such as by both sides confirming re-configuration metadata is empty or removed, via ready 1414). When the metadata is emptied or removed, the chaining logic presents empty metadata to the right-bound endpoint (left-bound interface 214) and initiates a (minimal) handshake 1416, since no metadata changes are required, and no keys requested.

In the case when a right-bound endpoint (left-bound interface 214) starts a new handshake (such as to enable encryption again), the chaining logic interrupts any right-bound handshake in progress, keeping I/O suspended, and wait for the ready state metadata on the left-bound endpoint (right-bound interface 216), at 1414, and then start a new handshake 1416. As noted, the right-bound traffic should be suspended 1404, before left-bound traffic is resumed at 1418 through 1422, to prevent any new data being encrypted (downstream until) after compute host 206 has received a confirmation of disablement of encryption (i.e., ready 1424, via acknowledgement 1426).

Thus, in accordance with embodiments for disablement of end-to-end efficient encryption with security chaining in accordance with embodiments of the present systems and methods, data appears (i.e., is) decrypted instantly, the same function is used in each segment 204 and chain 202 segments 204 remain replaceable.

Figure 15A:
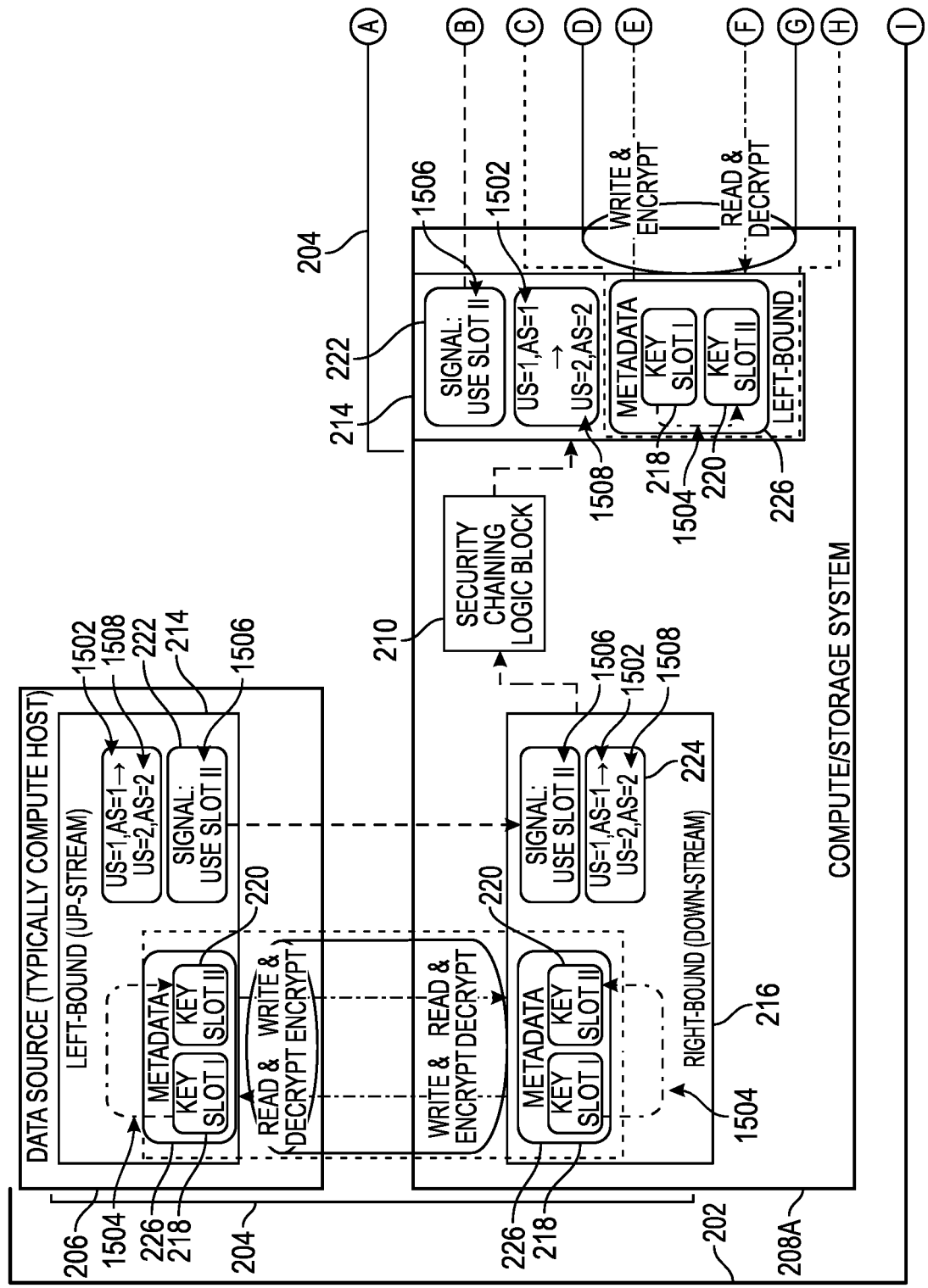
FIGS. 15A and 15B are partial views intended to form one complete view of a block diagram of an IHS network environment showing rekeying in end-to-end efficient encryption with security chaining, according to some embodiments.
Figure 15B:
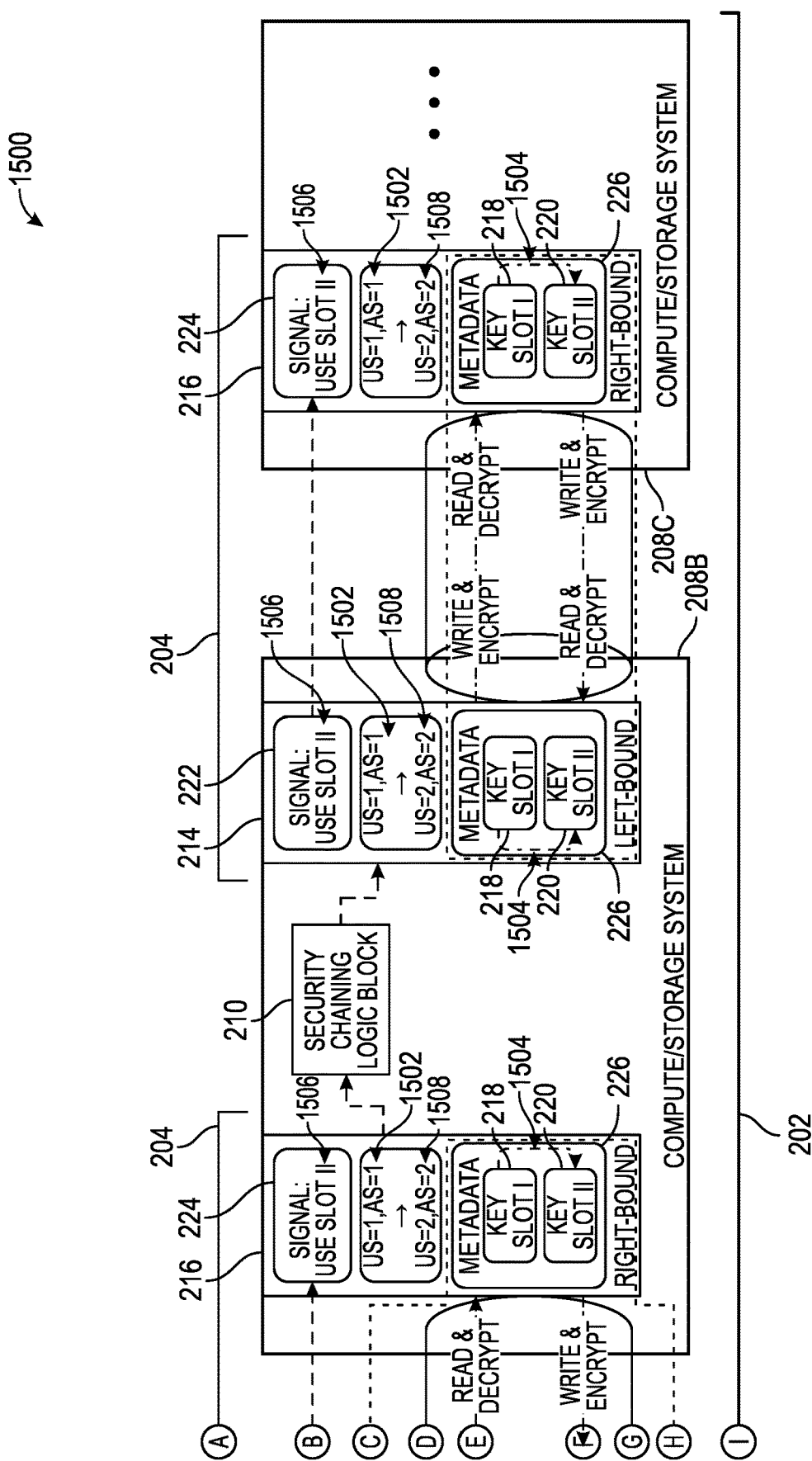
Figure 16:
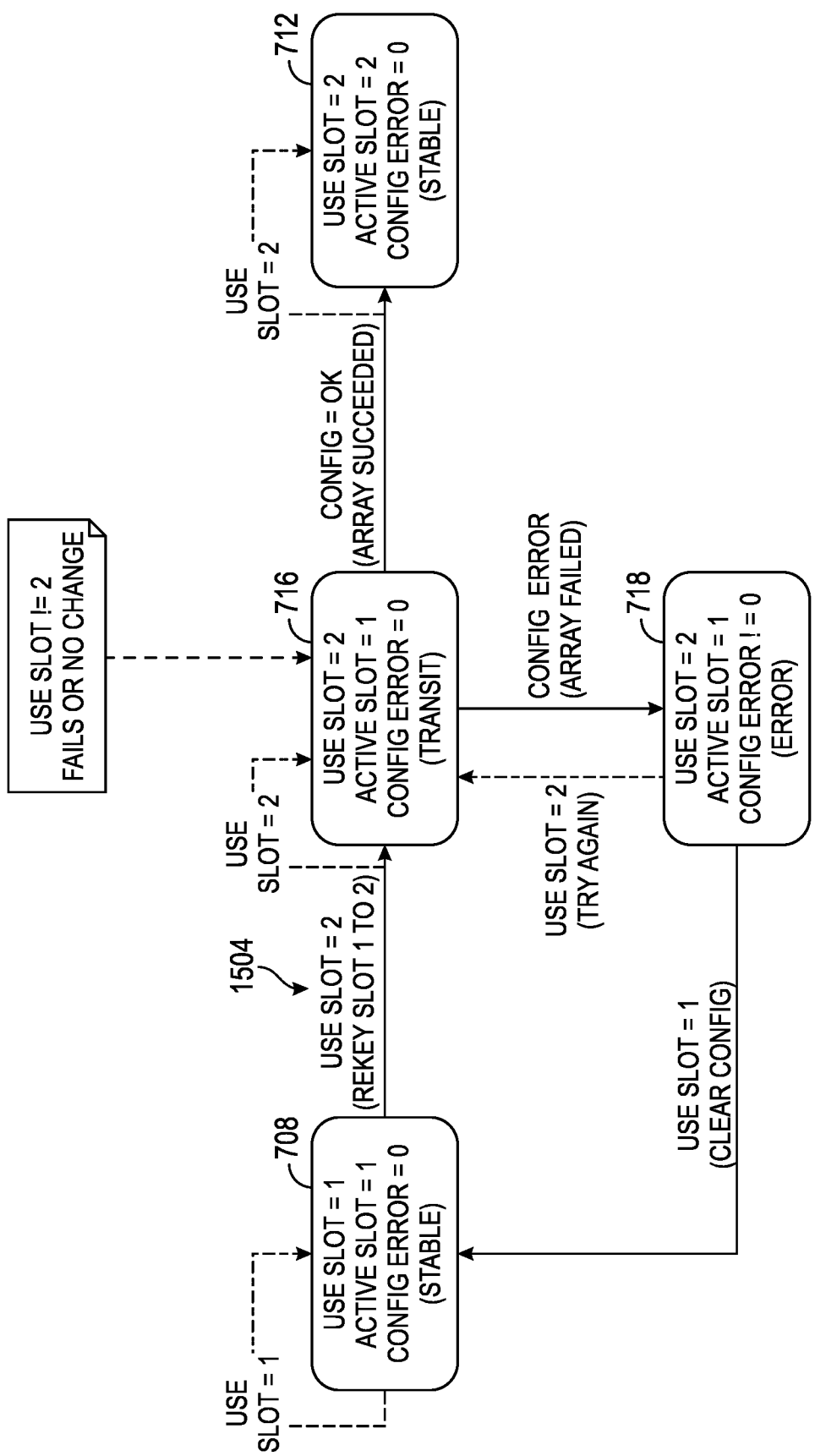
FIG. 16 is a state machine diagram for rekeying in end-to-end efficient encryption with security chaining, according to some embodiments.
Figure 17:
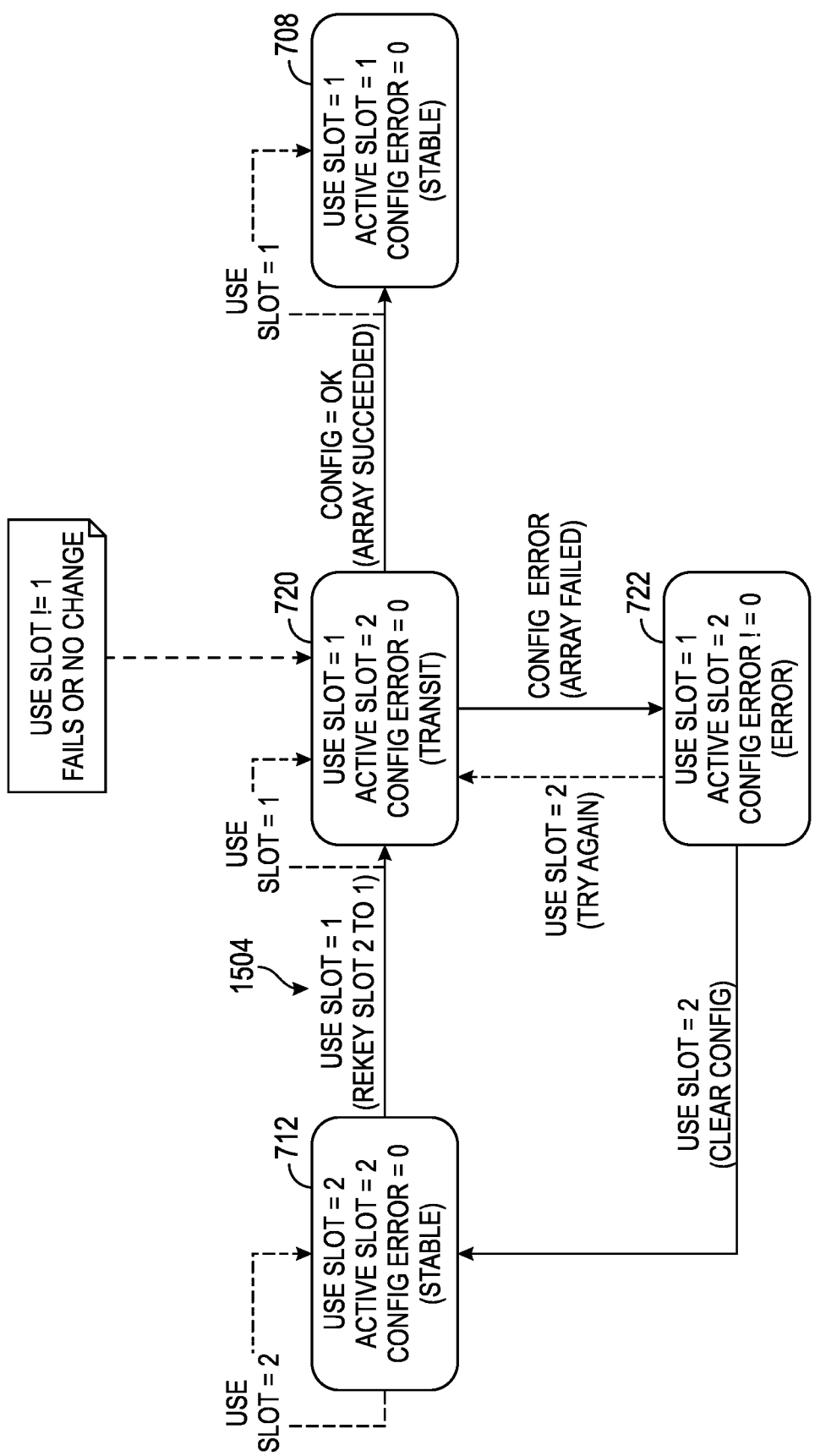
FIG. 17 is another state machine diagram for rekeying in end-to-end efficient encryption with security chaining, according to some embodiments.

FIGS. 15A and 15B are partial views intended to form one complete view of a block diagram of an IHS network environment, such as of single (serial) segment chain 202 of FIGS. 2A and B, showing rekeying 1500 in end-to-end efficient encryption with security chaining, according to some embodiments. In accordance with embodiments of the present systems and methods, rekey 1500 (shallow or deep) occurs "instantly" (i.e., over a short period of handshaking time) between all left and right endpoint pairs in the security chain. Any further data manipulation is not required. Rekeying in accordance with embodiments of the present systems and methods, may be used to provide "key rotation," changing the encryption key used to encrypt and decrypt data. Shallow rekey rekeys the KEK and any intermediate key(s), and deep rekey rekeys the KEK, IKs, and DEK. FIG. 16 is a state machine diagram for rekeying in end-to-end efficient encryption with security chaining, such as states 708, 712, 716 and 718 of FIG. 7, wherein, 708 shows state machine 224 as set at a(n) (initial) state where US (use slot)=1, AS (active slot)=1, according to some embodiments. FIG. 17 is another state machine diagram for rekeying in end-to-end efficient encryption with security chaining, such as states 708, 712, 720 and 722 of FIG. 7, wherein, 712 shows state machine 224 as set at a(n) (initial) state where US (use slot)=2, AS (active slot)=2, according to some embodiments.

Initial conditions 1502, in the example of FIGS. 15A and B, are shown as key slot I 218 is used and active (i.e. use slot)=1, AS (active slot)=1 (as in FIG. 16, at 708), such that encryption and/or decryption is occurring on all data in chain 202 with the keys (KEK, IKs, and DEK) in key slot I 218. To rekey, the volume is locked (no reading and/or writing by application(s)) and data source (host) 206 writes new metadata, at 1504 employing metadata key slot II 220. Security chaining logic block 220 ensures new metadata 226 propagates across chain 202 unmutated (same in all segments 204 across chain 202). State machine 224 remains at initial state (e.g., US=1, AS=1) 708 and encryption and/or decryption continues occurring on all data in the chain employing key slot I 218. However, data source 206 then sends signal 222 "Use slot from I to II," 1506 or the like, and security chaining 220 regenerates signal "Use slot from I to II" 1506 for next segment 204. State machine 224, in response, changes state from US=1, AS=1 (1502) to transit state US=2, AS=1, see, by way of example block 716 of FIGS. 7 and 16, then to US=2, AS=2 712. Security Chaining ensures this change (1508) occurs (backward) from (the last) segment to (the first) Segment. Thereby, (the last) segment to (the first) segment progressively switch to key slot II 220. Data source 206 then unlocks the volume and starts writing and/or reading user data, and all IHSs in chain 202 encrypt and/or decrypt user data, as called for using the new key(s) (e.g., decrypt user data when accessed (read) and encrypts user data when added or changed (written)) otherwise data is sent between the segments in encrypted format. Thusly, security chaining enables encryption and/or decryption (forward) from (the first) segment to (the last) segment, and encryption and/or decryption occurs in chain 202 using keys in key slot II 220.

As noted, efficient encryption rekeying in accordance with embodiments of the present systems and methods may support both shallow rekey (KEK) and deep rekey (KEK and DEK) operations. In accordance with various embodiments, rekey of intermedium key (IK) (if used) may be included in either shallow rekey or deep rekey. Embodiments of the present systems and methods may, support two sets of keys for "Atomic" metadata updates (i.e., indivisible and irreducible (series of) updates such that either all metadata updates occur, or no metadata update occurs), in the manner described above, one active key and one unused key, or one active key and one transition key.

Figure 18:
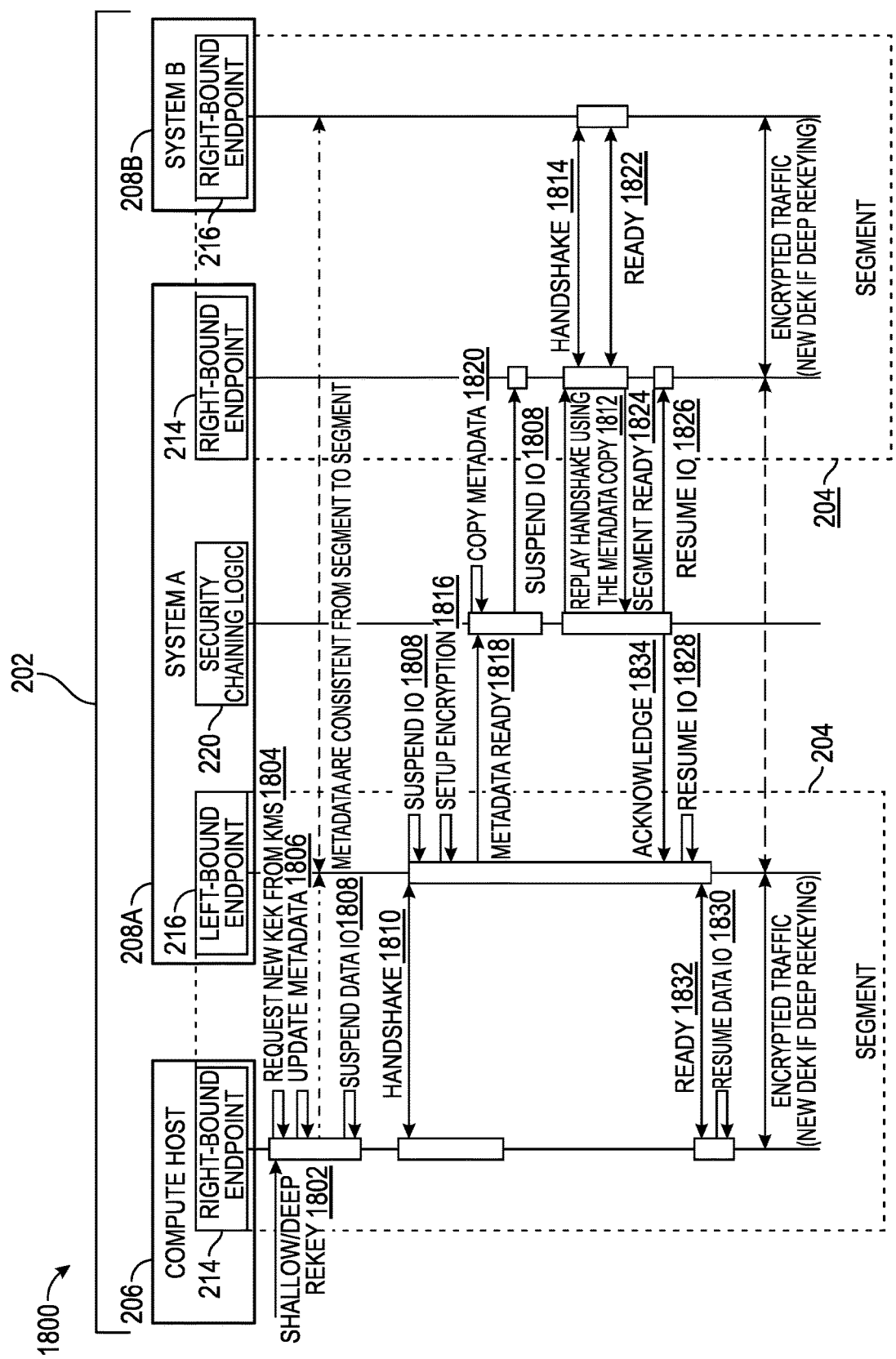
FIG. 18 is a swim lane workflow diagram showing rekeying in end-to-end efficient encryption with security chaining, according to some embodiments.

FIG. 18 is a swim lane workflow diagram showing rekeying 1800 in end-to-end efficient encryption with security chaining, such as of single (serial) segment chain 202 of FIGS. 2A and B, according to some embodiments. Both shallow rekeying (to rekey the KEK) and deep rekeying (to rekey the KEK and DEK) employ procedure 1800. Therein, upon shallow or deep rekey request 1802 compute host 206 requests a key from the KMS at 1804 and each of the IHSs in chain 202 retrieves the key updates 1804. Compute host 206 updates encryption metadata 226 at the trailer of the volume at 1806, The right-bound traffic should be suspended, at 1808, to prevent any (new) mis-encrypted data being transmitted downstream. Handshakes 1810, 1812 and 1814 are completed for all E2EEE segments. Again, handshakes 1810, 1812 and 1814 (signals 222) are via out-of-band (out-of-data) communications, (such as SCSI commands). Rekey (shallow or deep) occurs "instantly" (i.e., over a short period of handshaking time) between all left and right endpoint pairs in the security chain. Any further data manipulation is not required. For example, there is no need to re-encrypt and/or "walk-through" any existing datasets.

Security chaining logic 220 is responsible for replication of encryption metadata 226 to the right endpoint(s) (left-bound interface(s) 214) as well as generating appropriate control signals 222 to coordinate reconfiguration of the right encryption endpoint with the left-bound encryption endpoint (right-bound interface 216) of the downstream IHS(s). Security chaining logic 220 will not propagate metadata changes until the left endpoint (right-bound interface 216) successfully finishes the handshake. That is, until both sides confirm re-configuration 1816, metadata state is "ready" at 1818. When the metadata is ready at 1818, security chaining logic 220 copies the metadata at 1820 and replays 1812 the rekey handshake whether it be shallow or deep from left-bound endpoint to right-bound endpoint. In accordance with various embodiments of the present systems and methods, this replay of the rekey handshake may be asynchronously since the replication, itself, may be asynchronous. Chaining logic 220 then initiates right-bound handshake 1814, which is minimal, in accordance with the foregoing, since metadata 226 is in the ready state and does not need multistage updates accompanied by related control signals, or the like, as is typical. However, metadata updates which already contain the new key (KEK, IK, DEK, or all of them) at the beginning of this procedure are used by the chaining logic 220 (unmodified) across the chain between right-bound endpoints and left-bound endpoints.

In the case when the right-bound endpoint (left-bound interface 214) receives a metadata update 1812, chaining logic 220 should interrupt and roll back the right-bound handshake 1814 if there is one in progress and wait for the ready state metadata 1822, 1824 on the left-bound endpoint (right-bound interface 216). As noted, the right-bound traffic should be suspended 1808, before left-bound traffic is resumed at 1826 through 1830, to prevent any (new) mis-encrypted data being transmitted downstream, until after compute host 206 has received a confirmation of the secure channel (i.e., ready 1832, via acknowledgement 1834).

In accordance with embodiments of the present systems and methods, storage-based backup volumes, such as backup volumes mounted from a snapshot, cloned volumes, volumes mounted from replicas, and the like may be treated, in accordance herewith, as independent volumes from an original or source volume. In-band metadata on the volume may have enough information for embodiments of the present systems and methods to retrieve keys and encryption states to carry out (restart) efficient encryption procedures in accordance with embodiments of the present systems and methods. Resultingly, embodiments of the present systems and methods provide backup volume security, such as for volumes created during the original volume encryption enablement and rekeying and/or for volumes created after the original volume is encrypted and rekeyed.

Advantageously, embodiments of the present systems and methods achieve data confidentiality across the complete data path chain from the data source to final storage destination and still allows data processing efficiency in the IHSs on the data path chain. Embodiments of the present security chaining allows data confidentiality from one IHS to another and still allows data processing efficiency in all IHSs in the middle. Embodiments of the present systems and methods achieves "instant" (i.e., over a short period of handshaking time) data encryption operations (such as encryption enablement and/or disablement and/or shallow or deep rekeying) between compute host and host connected storage system and among chained compute and/or storage IHSs. A separate handshake control channel delivers flexible and robust security operation triggers (such as encryption enablement or disablement, shallow and deep rekey) across the complete data path chain, in embodiments of the present systems and methods. Security chaining in accordance with embodiments of the present systems and methods, allows addition, removal, and replacement of E2EEE segments, dynamically, without the need to reconfigure the entire security chain, as required in typical encryption schemes. The present handshake and state machine implementation is agnostic of any encryption function. The reason for a state transition and the effect of it is beyond the scope of an IHS in the chain. Only the metadata originator possesses this information and implements the higher-level logic such as applying encryption to the data blocks or changing the encryption key.

Embodiments of the present systems and methods may generally be applied to any distributed infrastructure with a data path that includes two or more IHSs. For example, for a compute server and external storage with replication, the compute server may be a Linux® or Windows® based IHS, a Kubernetes application with a Container Storage Interface (CSI) persistent volume, a Hypervisor node, or the like. Storage systems that may employ embodiments of the present systems and methods may include primary storage and remote replication storage. Edge computing infrastructure that includes (an) edge device(s) and/or server, edge gateway, edge data center, and cloud storage may employ embodiments of the present systems and methods.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An information handling system network end-to-end efficient encryption with security chaining method comprising:
   encrypting a data volume, by a data source information handling system;
   generating metadata in a trailer of an encrypted data volume, by the data source information handling system;
   generating out-of-band handshake signals, by the data source information handling system, indicating a key use slot in the metadata;
   performing, by a data connection segment interface, synchronous data volume write-encrypt and read-decrypt functions on the encrypted data volume, within an information handling system;
   performing, by the data connection segment interface, in-band encryption metadata processing;
   processing, by the data connection segment interface, out-of-band encryption handshake control signals;
   executing, by the data connection segment interface, an encryption configuration state machine, the encryption configuration state machine using the metadata and control signals as input to direct write-encrypt and read-decrypt actions on the encrypted data volume in the segment;
   relaying, by an information handling system security chaining logic component, between a left-bound interface and a right-bound interface;
   synchronizing and regenerating encryption handshake control signals for each segment, by the information handling system security chaining logic component;
   coordinating the state machine for an up-stream segment interface and the state machine for a down-stream segment interface, by the information handling system security chaining logic component.

2. The method of claim 1, wherein the data source information handling system comprises one left-bound interface encrypting the data volume, generating and updating the metadata in the trailer of the encrypted data volume, and generating and updating the out-of-band handshake signals.

3. The method of claim 2, further comprising a second plurality of data connection segments and wherein the data source information handling system further comprises a second right-bound interface.

4. The method of claim 1, wherein the metadata comprises volume metadata, encryption metadata and metadata protection.

5. The method of claim 4, wherein:
   the volume metadata comprises an encryption identifier, a volume universally unique identifier, an encryption type and/or capability, and/or an encryption mode;
   the encryption metadata comprises state machine input, and/or encryption parameters; and
   the metadata protection comprises integrity control with an authenticated checksum, version control, and/or segment configuration state control with designated data volume content verification.

6. The method of claim 5, wherein the encryption parameters comprise key encryption properties comprising universally unique identifier, algorithm, and/or control information.

7. The method of claim 5, wherein:
   the integrity control with authenticated checksum may be a hash-based message authentication code; and/or
   the version control may comprise a modification time and/or sequence number.

8. The method of claim 1, wherein the data volume is a small computer system interface logic unit number data volume or a non-volatile memory express data volume.

9. The method of claim 1, wherein the handshake signals comprise encryption control signals carried on networking protocols comprising, small computer system interface commands, internet small computer system interface commands, non-volatile memory express commands, or transmission control protocol/internet protocol connection commands.

10. The method of claim 1, wherein the data source information handling system further comprises one left-bound interface configured to request a key encryption key from a key management system and each interface is further configured to retrieve the key encryption key from the key management system, unwrap a data encryption key in accordance with the metadata and control signals for use in write-encrypt and read-decrypt functions on the encrypted data volume in the segment.

11. An information handling system network end-to-end efficient encryption system with security chaining comprising:
- a data source information handling system configured to:
  - encrypt a data volume;
  - generate and update metadata in a trailer of an encrypted data volume; and
  - generate and update out-of-band handshake signals indicating a key use slot in the metadata;
- a plurality of data connection segments, each data connection segment comprising a left-bound interface of one information handling system and a right-bound interface of another information handling system, each interface configured to:
  - perform synchronous data volume write-encrypt and read-decrypt functions on the encrypted data volume in an information handling system;
  - perform in-band encryption metadata processing;
  - process out-of-band encryption handshake control signals; and
  - execute an encryption configuration state machine, the encryption configuration state machine configured to use the metadata and control signals as input to direct write-encrypt and read-decrypt functions on the encrypted data volume in the segment; and
- a security chaining logic component hosted on each information handling system configured to:
  - relay between the left-bound interface and the right-bound interface;
  - synchronize and regenerate encryption handshake control signals for each segment; and
  - coordinate the state machine for the up-stream segment and the state machine for the down-stream segment.

12. The system of claim 11, wherein the data source information handling system comprises one left-bound interface configured to:
- encrypt the data volume;
- generate and update the metadata in the trailer of the encrypted data volume; and
- generate and update the out-of-band handshake signals.

13. The system of claim 12, further comprising a second plurality of data connection segments and wherein the data source information handling system further comprises a second left-bound interface.

14. The system of claim 11, wherein:
- the metadata comprises volume metadata, encryption metadata and metadata protection;
- the volume metadata comprises an encryption identifier, a volume universally unique identifier, an encryption type and/or capability, and/or an encryption mode;
- the encryption metadata comprises state machine input, and/or encryption parameters; and
- the metadata protection comprises integrity control with an authenticated checksum, version control, and/or segment configuration state control with designated data volume content verification.

15. The system of claim 14, wherein the encryption parameters comprise key encryption properties comprising universally unique identifier, algorithm, and/or control information.

16. The system of claim 14, wherein:
- the integrity control with authenticated checksum may be a hash-based message authentication code; and/or
- the version control may comprise a modification time and/or sequence number.

17. The system of claim 11, wherein the data volume is a small computer system interface logic unit number data volume or a non-volatile memory express data volume.

18. The system of claim 11, wherein the handshake signals comprise encryption control signals carried on networking protocols comprising, such as small computer system interface commands, internet small computer system interface commands, non-volatile memory express commands, or transmission control protocol/internet protocol connection commands.

19. The system of claim 11, wherein the data source information handling system comprises one left-bound interface configured to request a key encryption key from a key management system and each interface is further configured to retrieve the key encryption key from the key management system, unwrap a data encryption key in accordance with the metadata and control signals for use in write-encrypt and read-decrypt functions on the encrypted data volume in the segment.

20. An information handling system network with end-to-end efficient encryption with security chaining comprising:
- a data source information handling system configured to:
  - encrypt a data volume;
  - generate and update metadata in a trailer of an encrypted data volume, the metadata comprising volume metadata, encryption metadata and metadata protection; and
  - generate and update out-of-band handshake signals indicating a key use slot in the metadata;
- a plurality of information handling systems, each information handling system comprising:
  - a left-bound interface and a right-bound interface, each interface configured to:
    - perform synchronous data volume write-encrypt and read-decrypt functions on the encrypted data volume, within the information handling system;
    - perform in-band encryption metadata processing;
    - process out-of-band encryption handshake control signals; and
    - execute an encryption configuration state machine, the encryption configuration state machine configured to use the metadata and control signals as input to direct write-encrypt and read-decrypt actions on the encrypted data volume in the interface; and
  - a security chaining logic component hosted on each encryption system information handling system is configured to:
    - relay between the information handling system left-bound interface and the information handling system right-bound interface;
    - synchronize and regenerate encryption handshake control signals for each interface; and
    - coordinate the state machine for each interface.

* * * * *